United States Patent [19]

Watanabe et al.

[11] Patent Number: 5,403,908
[45] Date of Patent: Apr. 4, 1995

[54] ARYL STYRENE-BASED COPOLYMER

[75] Inventors: Masami Watanabe; Shuji Machida; Satoshi Asahi, all of Sodegauramachi, Japan

[73] Assignee: Idemitsu Kosan Company, Limited, Tokyo, Japan

[21] Appl. No.: 56,588

[22] Filed: Apr. 30, 1993

Related U.S. Application Data

[63] Continuation of Ser. No. 684,955, Apr. 30, 1991, abandoned.

[30] Foreign Application Priority Data

Oct. 6, 1989 [JP] Japan .................. 1-259998

[51] Int. Cl.$^6$ .................................. C08F 212/32
[52] U.S. Cl. ........................... 526/284; 526/160; 526/293; 526/346; 526/347
[58] Field of Search ............ 526/293, 284, 347, 160, 526/346

[56] References Cited

U.S. PATENT DOCUMENTS

| | | | |
|---|---|---|---|
| 3,764,590 | 10/1973 | Mukoh et al. | 526/280 X |
| 4,412,050 | 10/1983 | Mehta | 526/266 |
| 4,990,580 | 2/1991 | Ishihara et al. | 526/160 |
| 5,066,741 | 11/1991 | Campbell, Jr. | 526/347 X |
| 5,077,367 | 12/1991 | Campbell, Jr. et al. | 526/284 |
| 5,082,358 | 1/1992 | Tabata et al. | 526/293 X |

FOREIGN PATENT DOCUMENTS

| | | |
|---|---|---|
| 0210615 | 2/1987 | European Pat. Off. ............ 526/346 |
| 46-8988 | 3/1971 | Japan . |
| 48-40079 | 11/1973 | Japan . |
| 61-167901 | 7/1986 | Japan . |

OTHER PUBLICATIONS

Hackh's Chemical Dictionary, 4th ed., McGraw-Hill Co., N.Y., p. 62 (1969).
Natta et al., "Stereospecific Polymerization . . . of Vinyl Aromatic Monomers", Makromol. Chemie, 28, 253 (1958).

*Primary Examiner*—Fred Teskin
*Attorney, Agent, or Firm*—Frishauf, Holtz, Goodman & Woodward

[57] ABSTRACT

The present invention provides an aryl styrene-based polymer of a degree of polymerization of at least 5 having recurring units represented by the general formula

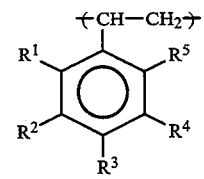

[I]

in the formula, $R^1$ to $R^5$ each denote a hydrogen atom, halogen atom or substituent group containing at least either one kind of a carbon atom, oxygen atom, nitrogen atom, sulfur atom, phosphorus atom, selenium atom, silicon atom and tin atom and at least one of the $R^1$ to $R^5$ denotes an aryl group having a hydrogen atom, aryl group having a halogen atom or aryl group having a substituent group containing at least either one kind of a carbon atom, oxygen atom, nitrogen atom, sulfur atom, phosphorus atom, selenium atom, silicon atom and tin atom, of which the stereospecificity is a mainly syndiotactic configuration and a method for the preparation thereof as well as a styrene-based copolymer and a method for the preparation thereof.

The aryl styrene-based copolymer of the present invention has a high syndiotacticity and is excellent in the heat resistance, resistance against chemicals and electric properties.

Further, the styrene-based copolymer of the present invention has a high syndiotacticity and, in addition, has a wide temperature range suitable for melt molding or is excellent in the heat resistance.

Accordingly, the present invention can be effectively utilized as heat-resistant resins, base materials of films and the like.

6 Claims, 15 Drawing Sheets

ARYL STYRENE-BASED COPOLYMER

This application is a Continuation of application Ser. No. 07/684,955, filed Apr. 30, 1991, now abandoned, which is the national phase application of PCT/JP90/01214, filed Sep. 21, 1990.

FIELD OF TECHNOLOGY

The present invention relates to an aryl styrene-based polymer which is a heat-resistant high polymer suitable as a base material of films, household electric appliances, automobile parts the like and is also satisfactory as a precursor of functional materials and to an efficient method for the preparation thereof.

Further, the present invention relates to a styrene-based copolymer containing an aryl styrene which is melt-moldable in a wide temperature range as a base material of films, electric appliances, automobile parts and the like and has excellent heat resistance and to a method for the preparation thereof.

BACKGROUND TECHNOLOGY

Aryl styrene-based polymers are synthesized by the radical polymerization [for example, Vysokomol. Soedin., 8 (10), 1804 (1966)], anion polymerization [for example, Makromol. Chem., 117, 94 (1968)], cation polymerization [for example, Polymer J., 7 (3), 320 (1975)] or Ziegler-Natta polymerization [for example, J. Polymer Sci. A-1, 5, 2323 (1967)] and most of them have an atactic configuration but the above mentioned J. Polymer Sci. A-1, 5, 2323 (1967) reports those having an isotactic configuration by using a titanium trichloride-triethyl aluminum catalyst.

On the other hand, styrene-based polymers mainly consisting of a syndiotactic configuration are disclosed in the official publication of Japanese Patent Kokai No. 63-172705, official publication of Japanese Patent Kokai No. 63-172706 and official publication of Japanese Patent Kokai No. 63-172707. No examples of preparation, however, have yet been reported of a highly heat resistant aryl styrene-based polymer having a syndiotactic configuration.

Apart therefrom, the assignee has been previously successful in the development of a styrene-based polymer having high syndiotacticity and disclosed the same (official publication of Japanese Patent Kokai No. 62-104818 and official publication of Japanese Patent Kokai No. 62-187708).

Although this polymer is excellent in the heat resistance, resistance against chemicals and electric properties, the inventors have continued extensive investigations in order to further upgrade these characteristics and arrived at a discovery that an aryl styrene-based polymer having a syndiotactic configuration can be obtained by polymerizing a styrene derivative having an aryl group leading to completion of the present invention on the base of this discovery.

On the other hand, resins having good heat resistance and moldability are eagerly desired as a material of electric appliances and material of automobile parts. Therefore, a proposal has been made of a polystyrene mainly consisting of a syndiotactic configuration (official publication of Japanese Patent Kokai No. 62-104818, official publication of No. 62-187708 of the same and elsewhere) but it has a problem that the temperature range suitable for melt-molding (difference between the melting point and the decomposition temperature) is small to cause a difficulty in molding.

Although the said polystyrene has relatively good heat resistance, furthermore, resins having still higher heat resistance are desired which can withstand severe conditions.

The present invention has an object, by solving these problems, to provide a resin having excellent moldability with a wide temperature range suitable for melt molding and excellent heat resistance as well as an efficient method for the preparation thereof.

DISCLOSURE OF THE INVENTION

Namely, the present invention, in the first place, provides an aryl styrene-based polymer, which is a polymer having a degree of polymerization of at least 5 and of which the stereo-specificity is mainly of the syndiotactic configuration, having recurring units represented by the general formula

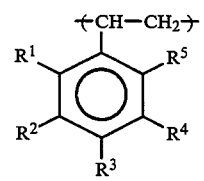

(in the formula, $R^1$ to $R^5$ each denote a hydrogen atom, halogen atom or substituent group containing at least one kind of a carbon atom, oxygen atom, nitrogen atom, sulfur atom, phosphorus atom, selenium atom, silicon atom and tin atom provided that at least one of $R^1$ to $R^5$ denotes an aryl group having a hydrogen atom, aryl group having a halogen atom or aryl group having a substituent group containing at least one kind of a carbon atom, oxygen atom, nitrogen atom, sulfur atom, phosphorus atom, selenium atom, silicon atom and tin atom).

Further, the present invention, in the second place, provides a method for the preparation of the aryl styrene-based polymer in the first of the present invention characterized by the polymerization of an aryl styrene represented by the general formula

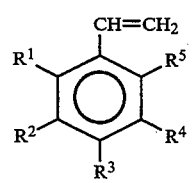

(in the formula, $R^1$ to $R^5$ each denote a hydrogen atom, halogen atom or substituent group containing at least one kind of a carbon atom, oxygen atom, nitrogen atom, sulfur atom, phosphorus atom, selenium atom, silicon atom and tin atom provided that at least one of $R^1$ to $R^5$ denotes an aryl group having a hydrogen atom, aryl group having a halogen atom or aryl group having a substituent group containing at least one kind of a carbon atom, oxygen atom, nitrogen atom, sulfur atom, phosphorus atom, selenium atom, silicon atom and tin atom) by using, as the catalytic ingredients, (A) a transition metal ingredient and (B) a contacting product of an organoaluminum compound and a condensation agent.

The aryl styrene-based polymer of the present invention has high syndiotacticity and is excellent in heat resistance, resistance against chemicals, electric properties and the like.

And, according to the method of the present invention, an aryl styrene-based polymer having high syndiotacticity can be prepared with good efficiency.

Accordingly, the present invention can be effectively utilized as a heat-resistant polymer or a precursor of a functional material and the like.

Further, the present invention, in the third place, provides a styrene-based copolymer, of which the stereospecificity is mainly of the syndiotactic configuration, having the structural units [III] represented by the general formula

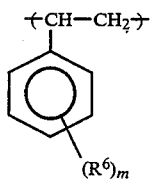

[III]

(in the formula, $R^6$ denotes a hydrogen atom, halogen atom or substituent group containing at least one kind of a carbon atom, oxygen atom, nitrogen atom, sulfur atom, phosphorus atom, selenium atom, silicon atom and tin atom and m denotes an integer of 0 to 5, with the proviso that, when m is a plural number, each $R^6$ can be the same as or different from the others) and the structural units [IV] represented by the general formula

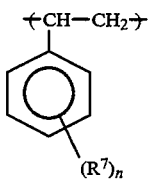

[IV]

(in the formula, $R^7$ denotes a hydrogen atom, halogen atom or a substituent group containing at least one kind of a carbon atom, oxygen atom, nitrogen atom, sulfur atom, phosphorus atom, selenium atom, silicon atom and tin atom with the proviso that at least one of the seven $nR^7$s is an aryl group having a hydrogen atom, aryl group having a halogen atom or aryl group having a substituent group containing at least one kind of a carbon atom, oxygen atom, nitrogen atom, sulfur atom, phosphorus atom, selenium atom, silicon atom and tin atom and n denotes an integer of 1 to 5) (excepting the case of identicalness with the above mentioned structural unit [III]) having a degree of polymerization of at least 5, which is a copolymer containing at least 0.1% by moles but not exceeding 20% by moles of the above mentioned structural units [IV].

Further, the present invention, in the fourth place, provides a styrene-based copolymer, of which the stereospecificity is mainly of the syndiotactic configuration, having the structural units [III] and the structural units [IV] (excepting the case of identicalness with the above mentioned structural units [III]), which is a copolymer having a degree of polymerization of at least 5 containing more than 20% by moles but not exceeding 99.9% by moles of the structural units [IV].

Further, the present invention, in the fifth place, provides a method for the preparation of a styrene-based copolymer of the third of the present invention or fourth of the present invention characterized in that a styrene-based monomer represented by the general formula

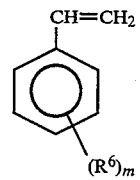

[V]

(in the formula, $R^6$ denotes a hydrogen atom, halogen atom or substituent group containing at least one kind of a carbon atom, oxygen atom, nitrogen atom, sulfur atom, phosphorus atom, selenium atom, silicon atom and tin atom and m denotes an integer of 1 to 5 with the proviso that, when m is a plural number, each $R^6$ can be the same as or different from the others) and an aryl styrene-based monomer represented by the general formula

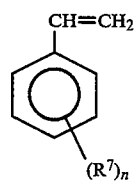

[VI]

(in the formula, $R^7$ denotes a hydrogen atom, halogen atom or substituent group containing at least one kind of a carbon atom, oxygen atom, nitrogen atom, sulfur atom, phosphorus atom, selenium atom, silicon atom and tin atom with the proviso that at least one of the n $R^7$s is an aryl group having a hydrogen atom, aryl group having a halogen atom or aryl group having a substituent group containing at least one kind of a carbon atom, oxygen atom, nitrogen atom, sulfur atom, phosphorus atom, selenium atom, silicon atom and tin atom and n denotes an integer of 1 to 5) (excepting the case of identicalness with the styrene-based monomer represented by the above given general formula [V]) are copolymerized by using, as the catalytic ingredients, (A) a transition metal ingredient and (B) a contacting product of an organoaluminum compound and a condensation agent.

The styrene-based copolymer of the third of the present invention having a mainly syndiotactic configuration and containing at least 0.1% by moles but not exceeding 20% by moles of the structural units [IV] (aryl styrene) has a wide temperature range suitable for melt-molding and is easily shaped into films and the like.

And, the styrene-based copolymer of the fourth of the present invention having a mainly syndiotactic configuration and containing more than 20% by moles but not exceeding 99.9% by moles of the structural units [IV] (aryl styrene) has a high glass transition point (Tg) and is excellent in heat resistance so that it can be used very usefully as a heat-resistant resin.

Further, the above mentioned copolymer can be prepared very efficiently by using the preparation method of the fifth of the present invention.

Accordingly, the styrene-based copolymer of the present invention can be effectively utilized as a heat-resistant resin, base material of films and the like.

BEST MODE TO PRACTICE THE INVENTION

Figure 1:
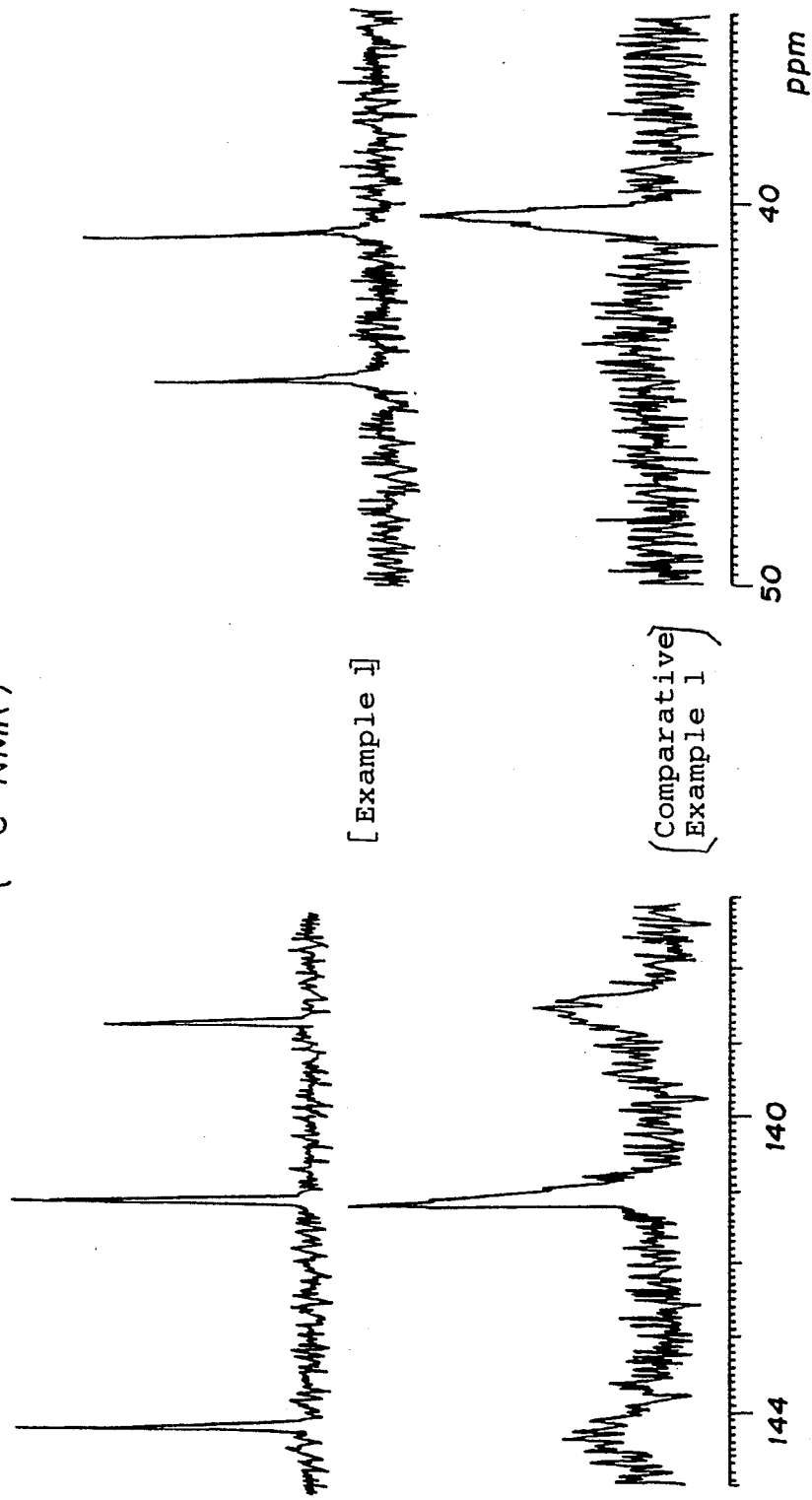
FIG. 1 is a spectral chart illustrating the results of the $^{13}$C-NMR (100 MHz) measurements of the polymers obtained in Example 1 and Comparative Example 1.

The aryl styrene-based polymer of the first embodiment of the present invention has the recurring units represented by the above described general formula [I] and the $R^1$ to $R^5$ in the above given general formula [I] is a nucleus-substituted group given above. The halogen atom here is exemplified by chlorine, fluorine, bromine and iodine. And, particular examples of the substituent group containing a carbon atom include alkyl groups having 1 to 20 carbon atoms such as methyl group, ethyl group, isopropyl group, tert-butyl group and the like and halogen-substituted alkyl groups having 1 to 20 carbon atoms such as chloroethyl group, bromoethyl group and the like. Further, particular examples of the substituent group containing a carbon atom and an oxygen atom include alkoxy groups having 1 to 10 carbon atoms such as methoxy group, ethoxy group, isopropoxy group and the like and alkoxy carbonyl groups having 1 to 10 carbon atoms such as methoxy carbonyl group, ethoxy carbonyl group and the like. Further, particular examples of the substituent group containing a carbon atom and a silicon atom include alkyl silyl groups having 1 to 20 carbon atoms such as a trimethyl silyl group and the like and particular examples of the substituent group containing a carbon atom and a tin atom include alkyl stannyl groups and aryl stannyl groups having 1 to 20 carbon atoms such as a trimethyl stannyl group, a tri-n-butyl stannyl group, a triphenyl stannyl group and the like. In the next place, particular examples of the substituent group containing a carbon atom and a nitrogen atom include alkylamino groups having 1 to 20 carbon atoms such as dimethyl amino group and the like and cyano group and the like. Further, particular examples of the substituent group containing a sulfur atom include a sulfonyl group, sulfonic acid alkyl ester groups, alkylthio groups, arylthio groups and mercapto group. Particular examples of the substituent group containing a selenium atom include alkyl seleno groups, aryl seleno groups, alkyl selenoxyl groups, aryl selenoxyl groups and the like. And, particular examples of the substituent group containing a phosphorus atom include phosphate ester groups, phosphite ester groups, dialkyl phosphino groups, diaryl phosphino groups, alkyl phosphinyl groups and aryl phosphinyl groups. Further, the groups containing no carbon atom include, for example, a nitro group, a diazo group and the like.

And, at least one among $R^1$ to $R^5$ denotes an aryl group having a hydrogen atom, an aryl group having a halogen atom or an aryl group having a substituent group containing at least one kind of a carbon atom, oxygen atom, nitrogen atom, sulfur atom, phosphorus atom, selenium atom, silicon atom or tin atom or, in other words, at least one substituent group among the $R^1$ to $R^5$ must be a hydrogen atom, halogen atom or substituent group containing a carbon atom, oxygen atom, nitrogen atom, sulfur atom, phosphorus atom, selenium atom, silicon atom or tin atom at any position, This substituent group in the aryl group is similar one to the above mentioned $R^1$ to $R^5$ and the aryl group denotes a substituent group containing a benzene ring, naphthalene ring, phenanthrene ring, anthracene ring, pyrene ring, chrysene ring, biphenyl ring, terphenyl ring, fluorene ring, pentalene ring, indene ring, azulene ring, heptalene ring, biphenylene ring, as-indacene ring, s-indacene ring, acenaphthylene ring, phenalene ring, fluoranthene ring, acephenanthrene ring, aceanthrylene ring, triphenylene ring, naphthacene ring, preiadene ring, picene ring, perylene ring, pentaphene ring, pentacene ring, rubicene ring, corocene ring, pyranthrene ring or ovalene ring.

Particular examples of the aryl styrene-based polymer having the recurring units represented by the above given general formula [I] include, for example, polyvinyl biphenyl compounds such as poly(4-vinyl biphenyl), poly(3-vinyl biphenyl), poly(2-vinyl biphenyl) and the like; polyvinyl phenyl naphthalene compounds such as poly[1-(4-vinyl phenyl)naphthalene], poly[2-(4-vinyl phenyl)naphthalene], poly[1-(3-vinyl phenyl)naphthalene], poly[2-(3-vinyl phenyl)naphthalene], poly[1-(2-vinyl phenyl)naphthalene], poly[2-(2-vinyl phenyl)-naphthalene] and the like; polyvinyl phenyl anthracene compounds such as poly[1-(4-vinyl phenyl)anthracene], poly[2-(4-vinyl phenyl)anthracene], poly[9-(4-vinyl phenyl)anthracene], poly[1-(3-vinyl phenyl)anthracene], poly[2-(3-vinyl phenyl)anthracene], poly[9-(3-vinyl phenyl)anthracene], poly[1-(2-vinylphenyl)anthracene], poly[2-(2-vinyl phenyl)anthracene], poly[9-(2-vinyl phenyl)anthracene] and the like; polyvinyl phenyl phenanthrene compounds such as poly[1-(4-vinyl phenyl)phenanthrene], poly[2-(4-vinyl phenyl)-phenanthrene], poly[3-(4-vinyl phenyl)phenanthrene], poly[4-(4-vinyl phenyl)phenanthrene], poly[9-(4-vinyl phenyl)phenanthrene], poly[1-(3-vinyl phenyl)-phenanthrene], poly[2-(3-vinyl phenyl)phenanthrene], poly[3-(3-vinyl phenyl)phenanthrene], poly[4-(3vinyl phenyl)phenanthrene], poly[9-(3-vinyl phenyl)phenanthrene], poly[1-(2-vinyl phenyl)phenanthrene], poly[2-(2-vinyl phenyl)phenanthrene], poly[3-(2-vinyl phenyl)phenanthrene], poly[4-(2-vinyl phenyl)phenanthrene], poly[9-(2-vinyl phenyl)phenanthrene] and the like; polyvinyl phenyl pyrene compounds such as poly[1-(4-vinyl phenyl)pyrene], poly[2-(4-vinyl phenyl)pyrene], poly[1-(3-vinyl phenyl)pyrene], poly[2-(3-vinyl phenyl)pyrene], poly[1-(2-vinyl phenyl)pyrene], poly[2-(2-vinyl phenyl)pyrene] and the like; polyvinyl terphenyl compounds such as poly(4-vinyl-p-terphenyl), poly(4-vinyl-m-terphenyl), poly(4-vinyl-o-terphenyl), poly(3-vinyl-p-terphenyl), poly(3-vinyl-m-terphenyl), poly(3-vinyl-o-terphenyl), poly(2-vinyl-p-terphenyl), poly(2-vinyl-m-terphenyl), poly(2-vinyl-o-terphenyl) and the like; poly(vinyl phenyl terphenyl) compounds such as 4-(4-vinyl phenyl)-p-terphenyl and the like; poly(vinyl alkyl biphenyl) compounds such as poly(4-vinyl-4-methyl biphenyl), poly(4-vinyl-3'-methyl biphenyl), poly(4-vinyl-2'-methyl biphenyl), poly(2-methyl-4-vinyl biphenyl), poly(3-methyl-4-vinyl biphenyl) and the like; poly(halogenated vinyl biphenyl) compounds such as poly (4-vinyl-4'-fluoro biphenyl), poly (4-vinyl-3'-fluoro biphenyl), poly (4-vinyl-2'-fluoro biphenyl), poly (4-vinyl-2-fluoro biphenyl), poly (4-vinyl-3-fluoro-biphenl), poly (4-vinyl-4'-chloro biphenyl), poly (4-vinyl-3'-chloro biphenyl), poly (4-vinyl-2'-chloro biphenyl), poly (4-vinyl-2-chloro biphenyl), poly (4-vinyl-3-chloro biphenyl), poly (4-vinyl-4'-bromo biphenyl), poly (4-vinyl-3'-bromo biphenyl), poly (4-vinyl-2'-bromo biphenyl),poly (4-vinyl-2-bromo biphenyl), poly (4-vinyl-3-bromo biphenyl) and the like; poly(alkoxy vinyl phenyl) compounds such as poly(4-vinyl-4'-methoxy biphenyl), poly (4-vinyl-3'-methoxy biphenyl), poly (4-vinyl-2'-methoxy biphenyl), poly (4-vinyl-2-methoxy biphenyl), poly (4-vinyl-3-methoxy biphenyl), poly(4-vinyl-4'-ethoxy biphenyl), poly (4-vinyl-3'-ethoxy biphenyl), poly (4-vinyl-2'-ethoxy biphenyl), poly (4-vinyl-2-ethoxy biphenyl), poly (4-vinyl-3-ethoxy biphenyl) and the like; poly(alkoxy carbonyl vinyl biphenyl) compounds such as poly(4-vinyl-4'-methoxy carbonyl biphenyl), poly(4-vinyl-4'-ethoxy carbonyl biphenyl) and the like; poly(alkoxy alkyl vinyl biphenyl) compounds such as poly(4-vinyl-4'-methoxy methyl biphenyl) and the like; poly(trialkyl silyl vinyl biphenyl) compounds such as poly (4-vinyl-4'-trimethyl silyl biphenyl) and the like; poly(trialkyl stannyl vinyl biphenyl) compounds such as poly (4-vinyl-4'-trimethyl stannyl biphenyl), poly(4-vinyl-4'-tributyl stannyl biphenyl) and the like; poly(trialkyl silyl methyl vinyl biphenyl) compounds such as poly(4-vinyl-4'-trimethyl silyl methyl biphenyl) and the like; poly(trialkyl stannyl methyl vinyl biphenyl) compounds such as poly(4-vinyl-4'-trimethyl stannyl methyl biphenyl), poly (4-vinyl-4'-tributyl stannyl methyl biphenyl) and the like; and so on.

Among them, polyvinyl biphenyl compounds, polyvinyl phenylene anthracene compounds and polyvinyl terphenyl compounds are preferable.

The aryl styrene-based polymer of the present invention having such a substituent group (the aryl styrene-based polymer having the recurring units represented by the above given general formula [I]) has stereospecificity of a mainly syndiotactic configuration and the degree of polymerization thereof is at least 5 or, preferably, at least 10 or, more preferably, from 50 to 15,000. Incidentally, the molecular weight distribution is not particularly limitative.

The mainly syndiotactic structure here implied in the aryl styrene-based polymer of the present invention is that having a stereochemical structure of a mainly syndiotactic configuration or, namely, a steric structure in which the substituted phenyl groups as the side chain are positioned alternately at the opposite directions relative to the main chain formed of carbon-to-carbon bonds (racemic modification) and the tacticity thereof can be quantitatively determined by means of the nuclear magnetic resonance method with isotopic carbon ($^{13}$C-NMR method).

The tacticity quantitatively determined by the $^{13}$C-NMR method can be indicated by the proportion of occurrence of a plural number of continuous structural units (namely, the proportion of occurrence of the relationship of the continuous relative steric conformation of the structural units) such as, for example, diad when two units are continuously bonded together, triad when three units are continuously bonded together, and pentad when five units are continuously bonded together. The aryl styrene-based polymer having mainly a syndiotactic configuration implied in the present invention means that having a syndiotacticity of, usually, at least 75% or, preferably, at least 85% in the racemic diad or at least 30% or, preferably, at least 50% in the racemic pented in the chain of the styrene-based recurring units although the degree of syndiotacticity is subject to variation to some extent depending on the kind of the substituent groups and the proportion in the contents of the respective recurring units.

The aryl styrene-based polymer of the first embodiment of the present invention as described above can be prepared in a high efficiency, for example, by the method of the second of the present invention shown below.

The second embodiment of the present invention is a method for the preparation of the above described aryl styrene-based polymer of the first of the present invention characterized in that an aryl styrene represented by the above given general formula [II] is polymerized by using (A) a transition metal ingredient and (B) a contacting product of an organoaluminum compound and a condensation agent as the catalytic ingredients.

The $R^1$ to $R^5$ in the above given general formula [II] here are the same as those shown in the description of the above given general formula [I].

Particular examples of the aryl styrene represented by the above given general formula [II] include, for example, vinyl biphenyl compounds such as 4-vinyl biphenyl, 3-vinyl biphenyl, 2-vinyl biphenyl and the like; vinyl phenyl naphthalene compounds such as 1-(4-vinyl phenyl)naphthalene, 2-(4-vinyl phenyl)naphthalene, 1-(3-vinyl phenyl)naphthalene, 2-(3-vinyl phenyl)naphthalene,, 1-(2-vinyl phenyl)naphthalene, 2-(2-vinyl phenyl)naphthalene and the like; vinyl phenyl anthracene compounds such as 1-(4-vinyl phenyl)anthracene, 2-(4-vinyl phenyl)anthracene, 9-(4-vinyl phenyl)anthracene, 1-(3-vinyl phenyl)anthracene, 2-(3-vinyl phenyl)anthracene, 9-(3-vinyl phenyl)anthracene, 1-(2-vinyl phenyl)anthracene, 2-(2-vinyl phenyl)anthracene, 9-(2-vinyl phenyl)anthracene and the like; vinyl phenyl phenanthrene compounds such as 1-(4-vinyl phenyl)phenanthrene, 2-(4-vinyl phenyl)phenanthrene, 3-(4-vinyl phenyl)phenanthrene, 4-(4-vinyl phenyl)phenanthrene, 9-(4-vinyl phenyl)phenanthrene, 1(3-vinyl phenyl)phenanthrene, 2-(3-vinyl phenyl)phenanthrene, 3-(3-vinyl phenyl)phenanthrene, 4-(3-vinyl phenyl)phenanthrene, 9-(3-vinyl phenyl)- phenanthrene, 1-(2-vinyl phenyl)phenanthrene, 2-(2-vinyl phenyl)phenanthrene, 3-(2-vinyl phenyl)phenanthrene, 4-(2-vinyl phenyl)phenanthrene, 9-(2-vinyl phenyl)phenanthrene and the like; vinyl phenyl pyrene compounds such as 1-(4-vinyl phenyl)pyrene, 2-(4-vinyl phenyl)pyrene, 1-(3-vinyl phenyl)pyrene, 2-(3-vinyl phenyl)pyrene, 1-(2-vinyl phenyl)pyrene; 2-(2-vinyl phenyl)pyrene and the like; vinyl phenyl terphenyl compounds such as 4-vinyl-p-terphenyl, 4-vinyl-m-terphenyl, 4-vinyl-o-terphenyl, 3-vinyl-p-terphenyl, 3-vinyl-m-terphenyl, 3-vinyl-o-terphenyl, 2-vinyl-p-terphenyl, 2-vinyl-m-terphenyl, 2-vinyl-o-terphenyl and the like; vinyl phenyl terphenyl compounds such as 4-(4-vinyl phenyl)-p-terphenyl and the like; vinyl alkyl biphenyl compounds such as 4-vinyl-4'-methyl biphenyl, 4-vinyl-3'-methyl biphenyl, 4-vinyl-2'-methyl biphenyl, 2-methyl-4-vinyl biphenyl, 3-methyl-4-vinyl biphenyl and the like; halogenated vinyl biphenyl compounds such as 4-vinyl-4'-fluoro biphenyl, 4-vinyl-3'-fluoro biphenyl, 4-vinyl-2'-fluoro biphenyl, 4-vinyl-2-fluoro biphenyl, 4-vinyl-3-fluoro biphenyl, 4-vinyl-4'-Chloro biphenyl, 4-vinyl-3'-chloro biphenyl, 4-vinyl-2'-chloro biphenyl, 4-vinyl-2-chloro biphenyl, 4-vinyl-3-chloro biphenyl, 4-vinyl-4'-bromo biphenyl, 4-vinyl-3'-bromo-biphenyl, 4-vinyl-2'-bromo biphenyl, 4-vinyl-2-bromo biphenyl, 4-vinyl-3-bromo biphenyl and the like; alkoxy vinyl biphenyl compounds such as 4-vinyl-4'-methoxy biphenyl, 4-vinyl-3'-methoxy biphenyl, 4-vinyl-2'-methoxy biphenyl, 4-vinyl-2-methoxy biphenyl, 4-vinyl-3-methoxy biphenyl, 4-vinyl-4'-ethoxy biphenyl, 4-vinyl-3'-ethoxy biphenyl, 4-vinyl-2'-ethoxy biphenyl, 4-vinyl-2-ethoxy biphenyl, 4-vinyl-3-ethoxy biphenyl and the like; alkoxy carbonyl vinyl biphenyl compounds such as 4-vinyl-4'-methoxy carbonyl biphenyl, 4-vinyl-4'-ethoxy carbonyl biphenyl and the like; alkoxy alkyl vinyl biphenyl compounds such as 4-vinyl-4'-methoxy methyl biphenyl and the like; trialkylsilyl vinyl biphenyl compounds such as 4-vinyl-4'-trimethylsilyl biphenyl and the like; trialkylstannyl vinyl biphenyl compounds such as 4-vinyl-4'-trimethylstannyl biphenyl, 4-vinyl-4'-tributylstannyl biphenyl and the like; trialkylsilyl methyl vinylbiphenyl compounds such as 4-vinyl-4'-trimethylsilyl methyl biphenyl and the like; trialkylstannyl methyl vinyl biphenyl compounds such as 4-vinyl-4'-trimethylstannyl methyl biphenyl, 4-vinyl-4'-tributylstannyl methyl biphenyl and the like; and so on. Among them, vinyl biphenyl compounds, vinyl phenyl anthracene compounds and vinyl terphenyl compounds are preferable.

In the second embodiment of the present invention, the above described aryl styrene is polymerized by using (A) a transition metal ingredient and (B) a contacting product of an organoaluminum compound and a condensation agent.

The transition metal compound usable here as (A) the transition metal ingredient includes various ones and, in particular, it is preferable to use those represented by the general formulas $$M^1R^8_aR^9_bR^{10}_cR^{11}_{[4-(a+b+c)]} \qquad [\text{VII}]$$
$$M^2R^{12}_dR^{13}_eR^{14}_{[3-(d+e)]} \qquad [\text{VIII}]$$

 $R^{15}_fR^{16}_{2-f}$ [IX]

or

-continued

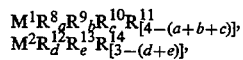 $R^{17}_gR^{18}_hR^{19}_{[3-(g+h)]}$ [X]

[in the formula, $R^8$ to $R^{19}$ each denote a hydrogen atom, halogen atom, alkyl group having 1 to 20 carbon atoms, alkoxy group having 1 to 20 carbon atoms, aryl group having 6 to 20 carbon atoms, aryl alkyl group having 6 to 20 carbon atoms, acyloxy group having 1 to 20 carbon atoms, acetyl acetonyl group, cyclopentadienyl group, substituted cyclopentadienyl group or indenyl group. And, a, b and c each denote an integer of at least 0 satisfying $0 \leq a+b+c \leq 4$, d and e each denote an integer of at least 0 satisfying $0 \leq d+e \leq 3$, f denotes an integer of at least 0 satisfying $0 \leq f \leq 2$ and g and h each denote an integer of at least 0 satisfying $0 \leq g+h \leq 3$. Further, $M^1$ and $M^2$ each denote titanium, zirconium, hafnium or vanadium and $M^3$ and $M^4$ each denote vanadium].

Among the transition metal compounds represented by the above given general formulas [VII], [VIII], [IX] or [X], it is preferable to use a titanium compound or zirconium compound represented by the formula [VII], in particular.

Among those denoted by the $R^8$ to $R^{19}$ in the above given general formulas [VII], [VIII], [IX] or [X], the halogen atoms include chlorine, bromine, iodine or fluorine, in particular. The alkyl groups having 1 to 20 carbon atoms are exemplified, in particular, by methyl group, ethyl group, propyl group, n-butyl group, isobutyl group, amyl group, isoamyl group, octyl group, 2-ethylhexyl group and the like. And, the alkoxy groups having 1 to 20 carbon atoms are exemplified, in particular, by methoxy group, ethoxy group, propoxy group, butoxy group, amyloxy group, hexyloxy group, octyloxy group, 2-ethylhexyloxy group and the like. Further, the aryl groups having 6 to 20 carbon atoms are exemplified, in particular, by phenyl group, naphthyl group and the like. In the next place, the arylalkyl groups having 6 to 20 carbon atoms are exemplified, in particular, by benzyl group, phenethyl group, 9-anthryl methyl group and the like. And, the acyloxy groups having 1 to 20 carbon atoms are exemplified, in particular, by acetyloxy group, stearoyloxy group and the like. Further, the substituted cyclopentadienyl groups are exemplified, for example, by the cyclopentadienyl groups substituted with at least one alkyl group having 1 to 6 carbon atoms such as, in particular, methyl cyclopentadienyl group, 1,2-dimethyl cyclopentadienyl group, pentamethyl cyclopentadienyl group and the like. These $R^8$ to $R^{19}$ can be either the same ones or different ones provided that the above described conditions are met.

Particular examples of the titanium compound among the transition metal compounds represented by the above given general formulas [VII], [VIII], [IX] or [X] as above include tetramethoxy titanium, tetraethoxy titanium, tetra-n-butoxy titanium, tetraisopropoxy titanium, cyclopentadienyl trimethyl titanium, cyclopentadienyl triethyl titanium, cyclopentadienyl tripropyl titanium, cyclopentadienyl tributyl titanium, methyl cyclopentadienyl trimethyl titanium, 1,2-dimethyl cyclopentadienyl trimethyl titanium, pentamethyl cyclopentadienyl trimethyl titanium, pentamethyl cyclopentadienyl triethyl titanium, pentamethyl cyclopentadienyl tripropyl titanium, pentamethyl cyclopentadienyl tributyl titanium, cyclopentadienyl methyl titanium dichloride, cyclopentadienyl ethyl titanium dichloride, pentamethyl cyclopentadienyl methyl titanium dichloride, pentamethyl cyclopentadienyl ethyl titanium dichloride, cyclopentadienyl dimethyl titanium monochloride, cyclopentadienyl diethyl titanium monochloride, cyclopentadienyl titanium trimethoxide, cyclopentadienyl titanium triethoxide, cyclopentadienyl titanium tripropoxide, cyclopentadienyl titanium triphenoxide, pentamethyl cyclopentadienyl titanium trimethoxide, pentamethyl cyclopentadienyl titanium triethoxide, pentamethyl cyclopentadienyl titanium tripropoxide, pentamethyl cyclopentadienyl titanium tributoxide, pentamethyl cyclopentadienyl titanium triphenoxide, cyclopentadienyl titanium trichloride, pentamethyl cyclopentadienyl titanium trichloride, cyclopentadienyl methoxy titanium chloride, cyclopentadienyl dimethoxy titanium chloride, pentamethyl cyclopentadienyl methoxy titanium dichloride, cyclopentadienyl tribenzyl titanium, pentamethyl cyclopentadienyl methyl diethoxy titanium, indenyl titanium trichloride, indenyl titanium trimethoxide, indenyl titanium triethoxide, indenyl trimethyl titanium, indenyl tribenzyl titanium and the like.

Among these titanium compounds, the compounds containing no halogen atom are satisfactory and, in particular, the tetra-coordination type titanium compounds of which at least one ligand is an unsaturated π-electron type ligand as described above are preferable.

And, particular examples of the zirconium compounds among the transition metal compounds represented by the above given general formulas [VII], [VIII], [IX] or [X] include cyclopentadienyl zirconium trimethoxide, pentamethyl cyclopentadienyl zirconium trimethoxide, cyclopentadienyl tribenzyl zirconium, pentamethyl cyclopentadienyl tribenzyl zirconium, bisindenyl zirconium dichloride, zirconium dibenzyl dichloride, zirconium tetrabenzyl, tributoxy zirconium chloride, triisopropoxy zirconium chloride and the like.

Similarly, furthermore, particular examples of the hafnium compound include cyclopentadienyl hafnium trimethoxide, pentamethyl cyclopentadienyl hafnium trimethoxide, cyclopentadienyl tribenzyl hafnium, pentamethyl cyclopentadienyl tribenzyl hafnium, bisindenyl hafnium dichloride, hafnium dibenzyl chloride, hafnium tetrabenzyl, tributoxy hafnium chloride, triisopropoxy hafnium chloride and the like.

And, similarly, particular examples of the vanadium compound include vanadium trichloride, vanadyl trichloride, vanadium triacetylacetonate, vanadium tetrachloride, vanadyl tributoxide, vanadyl dichloride, vanadyl bisacetylacetonate, vanadyl triacetylacetonate and the like.

On the other hand, (B) the contacting product of an organo-aluminum compound and a condensation agent as the other ingredient in the catalyst used in the method of the second embodiment of the present invention is, for example, of the same kind as those described in the official publication of Japanese Patent Kokai No. 62-187708 and the details thereof are as described below.

Namely, this contacting product is obtained by contacting various kinds of organoaluminum compounds with a condensation agent.

The organoaluminum compound here is exemplified, usually, by the organoaluminum compounds represented by the general formula AlR$^{20}$$_3$ (in the formula, R$^{20}$ denotes an alkyl group having 1 to 8 carbon atoms) including, in particular, trialkyl aluminums such as trimethyl aluminum, triethyl aluminum, triisobutyl aluminum and the like, of which trimethyl aluminum is the most preferable. Incidentally, the condensation agent is exemplified typically by water but, besides, also exemplified by various kinds of those with which the above mentioned trialkyl aluminum is subjected to a condensation reaction such as copper sulfate pentahydrate, adsorption water on an inorganic material or organic material and the like.

Typical examples of the condensation product of an organoaluminum compound and a condensation agent as the ingredient (B) in the catalyst used in the second embodiment of the present invention include the contacting products of the trialkyl aluminum represented by the above given general formula AlR$^{20}$$_3$, of which particular examples include chain-like alkyl aluminoxanes represented by the general formula

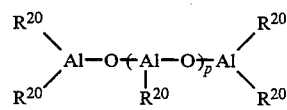

(in the formula, p is 0 to 50 denoting the degree of polymerization and R$^{20}$ denotes an alkyl group having 1 to 8 carbon atoms as in the above), cyclic alkyl aluminoxanes (number of the recurring units 2 to 50) having the recurring units represented by the general formula

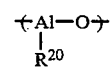

(in the formula, R$^{20}$ has the same meaning as described above) and the like.

Usually, the contacting product of an organoaluminum compound such as trialkyl aluminums and the like and water is a mixture of, besides the above mentioned chain-like alkyl aluminoxanes and cyclic alkyl aluminoxanes, the unreacted trialkyl aluminum and various kinds of condensation products or, further, a molecule by complicated association thereof and can be a variety of products depending on the contacting conditions of the trialkyl aluminum and water.

The method for the reaction of the organoaluminum compound and water in this case is not particularly limitative and the reaction can be performed according to a known method. For example, ① a method in which the organoaluminum compound dissolved in an organic solvent is contacted with water, ② a method in which the organoaluminum compound is added in the start of the polymerization followed by subsequent addition of water, ③ a method in which the organoaluminum compound is reacted with water of crystallization contained in a metal salt and the like or adsorption water on an inorganic material or organic material, and so on are known. Meanwhile, this reaction can proceed even in the absence of any solvent but preferably should be performed in a solvent and suitable solvents include aliphatic hydrocarbons such as hexane, heptane, decane and the like and aromatic hydrocarbons such as benzene, toluene, xylene and the like. And, it is optional that the above mentioned water contains up to about 20% of ammonia, an amine such as ethyl amine and the like, sulfur compound such as hydrogen sulfide and the like, phosphorus compound such as phosphite esters and the like, and so on.

In the contacting product of an organoaluminum compound and a condensation agent used as the ingredient (B) in the catalyst in the second of the present invention (for example, an alkyl aluminoxane), it is preferable that the above mentioned contacting reaction is followed by removal of the solid residue by filtration when a water-containing compound is used and the filtrate is subjected to a heat treatment under normal pressure or under reduced pressure in the ranges of the temperature of 30° to 200° C. or, preferably, the temperature of 40° to 150° C. for 20 minutes to 8 hours or, preferably, for 30 minutes to 5 hours while the solvent is being removed by distillation.

In carrying out this heat treatment, the temperature can be adequately selected depending on various situations but it is usually carried out in the above mentioned range. Usually, it is undesirable in each of the cases that the temperature is lower than 30° C. not to exhibit the effect and exceeds 200° C. to cause thermal decomposition of the alkyl aluminoxane per se.

Depending on the treatment conditions of the heat treatment, the reaction product is obtained in the form of a colorless solid or a solution. The product obtained in this manner can be used as a catalyst solution by dissolving or diluting with a hydrocarbon solvent according to need.

Preferable examples of such a contacting product of an organoaluminum compound and a condensation agent used as the ingredient (B) in the catalyst or, in particular, an alkyl aluminoxane are those of which observation by the proton nuclear magnetic resonance absorption method gives 50% or less of the high magnetic field constituent in the methyl proton signal range due to the linkage of aluminum and methyl group (Al—$CH_3$). When the above described contacting product is subjected to observation of the proton nuclear magnetic resonance ($^1$H-NMR) spectrum in toluene solvent at room temperature, namely, the methyl proton signal due to Al—$CH_3$ is found in the range of 1.0−0.5 ppm with reference to tetramethyl silane (TMS). Since the proton signal of TMS (0 ppm) is found within the observation range of the methyl proton due to Al—$CH_3$, those satisfactorily usable as the ingredient (B) of the catalyst should have the high magnetic field constituent not to exceed 50% or, preferably, from 45 to 5% of the whole when the methyl proton signal due to the Al—$CH_3$ is determined with reference to the methyl proton signal 2.35 ppm of toluene with reference to TMS and divided into the high magnetic field constituent (namely, −0.1 to −0.5 ppm) and the constituent of the other magnetic field (namely, 1.0 to −0.1 ppm).

The catalyst used in the method of the present invention is composed mainly of the above described ingredients (A) and (B) and it is optional according to desire, besides the above, to add another catalytic ingredient such as, for example, a trialkyl aluminum represented by the general formula

(in the formula, $R^{21}$ denotes an alkyl group having 1 to 8 carbon atoms) or other organometallic compounds and the like.

In the second embodiment of the present invention, an aryl styrene-based monomer is polymerized by using the catalyst obtained in the above described manner and the polymerization method to be used can be any of the methods such as bulk polymerization, solution polymerization, suspension polymerization and the like. And, in this case, aliphatic hydrocarbons such as pentane, hexane, heptane and the like, alicyclic hydrocarbons such as cyclohexane and the like and aromatic hydrocarbons such as benzene, toluene, xylene and the like are used as the solvent. In this case, the proportion of monomer/solvent can be freely selected.

And, the conditions of polymerization are not particularly limitative but, usually, include a polymerization temperature of 0° to 120° C. or, preferably, 10° to 80° C. and a polymerization time of 5 minutes to 24 hours or, preferably, at least 1 hour.

Further, the molecular weight of the aryl styrene-based polymer to be obtained can be effectively controlled by conducting in the presence of hydrogen.

In the use of this catalyst, furthermore, the proportion of the ingredient (A) and the ingredient (B) in the catalyst depends on the types of the respective ingredients, kind of the aryl styrene-based monomer represented by the general formula [II] as the starting material and other conditions and hardly selected definitely but, usually, it is from 20/1 to 10000/1 (molar ratio) or, preferably, from 100/1 to 1000/1 (molar ratio) calculated as the ratio of the aluminum in the catalytic ingredient (B) and the transition metal in the transition metal ingredient (A) or, namely, aluminum/transition metal (molar ratio). And, the monomer/aluminum (molar ratio) is from 10000/1 to 0.01/1 (molar ratio) or, preferably, from 200/1 to 0.5/1.

Incidentally, the order of charging of the starting material and the catalytic ingredients is not particularly limitative and can be in any desired order.

In the above described manner, the aryl styrene-based polymer of the first embodiment of the present invention can be prepared.

As is mentioned before, this polymer has a high syndiotacticity and a high-purity aryl styrene-based polymer of very high syndiotacticity can be obtained, according to need, by a deashing treatment with a washing solution containing hydrochloric acid and the like and, through washing and drying under reduced pressure, by removal of the soluble matter by washing with a solvent such as methyl ethyl ketone and the like.

In the next place, the styrene-based copolymer in the present invention has the structural units [III] (recurring units) represented by the above given general formula [III] and the structural units [IV] (recurring units) represented by the general formula [IV].

The $R^6$ in the structural unit [III] here denotes a hydrogen atom, halogen atom or substituent group containing at least one kind of a carbon atom, oxygen atom, nitrogen atom, sulfur atom, phosphorus atom, selenium atom, silicon atom and tin atom. The halogen atom here includes chlorine, fluorine, bromine and iodine. And, particular examples of the substituent group containing a carbon atom include alkyl groups having 1 to 20 carbon atoms such as methyl group, ethyl group, isopropyl group, tertbutyl group and the like; aryl groups of 6 to 30 carbons atoms having a substituent group containing a hydrogen atom, halogen atom, carbon atom, oxygen atom, nitrogen atom, sulfur atom, phosphorus atom, selenium atom, silicon atom or tin atom and the like on the benzene ring; halogen-substituted alkyl groups having 1 to 20 carbon atoms such as chloroethyl group, bromomethyl group, bromoethyl group and the like; and so on.

Here, the aryl groups of 6 to 30 carbon atoms having a substituent group containing a hydrogen atom, halogen atom, carbon atom, oxygen atom, nitrogen atom, sulfur atom, phosphorus atom, selenium atom, silicon atom or tin atom and the like on the benzene ring include, for example, a benzene ring, naphthalene ring, phenanthrene ring, anthracene ring, indene ring, azulene ring, heptalene ring, biphenylene ring, as-indacene ring, s-indacene ring, acenaphthylene ring, phenalene ring, fluoranthene ring, acephenanthrene ring, aceanthrylene ring, triphenylene ring, naphthacene ring, preiadene ring, picene ring, perylene ring, pentaphene ring, pentacene ring, rubicene ring, coronene ring, pyranthrene ring and ovalene ring as well as the same substituted at any position with an alkyl substituent group (methyl group, ethyl group, isopropyl group, tertbutyl group and the like), halogen-substituted alkyl group (chloroethyl group, bromoethyl group and the like), substituent group containing an oxygen atom (methoxy group, ethoxy group, isopropoxy group, methoxy carbonyl group, acyloxy groups and the like), substituent group containing a silicon atom (trimethyl silyl group and the like), substituent group containing a tin atom (trimethyl stannyl group, tributyl stannyl group, triphenyl stannyl group and the like), substituent group containing a nitrogen atom (dimethyl amino group, diazo group, nitro group, cyano group and the like), substituent group containing a sulfur atom (sulfone group, sulfonic acid methyl ester group, phenylthio group, methylthio group, mercapto group and the like), substituent group containing a selenium atom (methylseleno group, phenylseleno group, methyl selenoxyl group, phenyl selenoxyl group and the like), substituent group containing a phosphorus atom (phosphoric acid methyl ester group, phosphite ester group, dimethyl phosphino group, diphenyl phosphino group, methyl phosphinyl group, phenyl phosphinyl group and the like) and so on.

And, the substituent group containing an oxygen atom is exemplified by the methoxy group, ethoxy group, isopropoxy group, methoxy carbonyl group, acyloxy groups and the like and the substituent group containing a silicon atom is exemplified by trimethyl silyl group and the like. In the next place, the substituent group containing a tin atom is exemplified by trimethyl stannyl group, tributyl stannyl group, triphenyl stannyl group and the like. Further, the substituent group containing a nitrogen atom is exemplified by dimethyl amino group, diazo group, nitro group, cyano group and the like and the substituent group containing a sulfur atom is exemplified by sulfone group, sulfonic acid methyl ester group, phenylthio group, methylthio group, mercapto group and the like. And, the substituent group containing a selenium atom is exemplified by methylseleno group, phenylseleno group, methyl selenoxyl group, phenyl selenoxyl group and the like and the substituent group containing a phosphosrus atom is exemplified by phosphoric acid methyl ester group, phosphite ester group, dimethyl phosphino group, diphenyl phosphino group, methyl phosphinyl group, phenylphosphinyl group and the like.

And, in the structural unit [III] represented by the general formula [III], m is an integer of 0 to 5 and, when the m there is a plural number, the $R^8$s of m in number can be either the same ones or different ones, respectively.

Particular examples of the structural unit [III] having such a substituent group include styrene; alkyl styrenes such as p-methyl styrene, m-methyl styrene, o-methyl styrene, 2,4-dimethyl styrene, 2,5-dimethyl styrene, 3,4-dimethyl styrene, 3,5-dimethyl styrene, p-tert-butyl styrene and the like; halogenated styrenes such as p-chloro styrene, m-chloro styrene, o-chloro styrene, p-bromo styrene, m-bromo styrene, o-bromo styrene, p-fluoro styrene, m-fluoro styrene, o-fluoro styrene, o-methyl-p-fluoro styrene and the like; vinyl biphenyl compounds such as 4-vinyl biphenyl, 3-vinyl biphenyl, 2-vinyl biphenyl and the like; vinyl phenyl naphthalene compounds such as 1-(4-vinyl phenyl)naphthalene, 2-(4-vinyl phenyl)naphthalene, 1-(3-vinyl phenyl)naphthalene, 2-(3-vinyl phenyl)naphthalene, 1-(2-vinyl phenyl)-naphthalene, 2-(2-vinyl phenyl)naphthalene and the like; vinyl phenyl anthracene compounds such as 1-(4-vinyl phenyl)anthracene, 2-(4-vinyl phenyl)anthracene, 9-(4-vinyl phenyl)anthracene, 1-(3-vinyl phenyl)anthracene, 2-(3-vinyl phenyl)anthracene, 9-(3-vinyl phenyl)anthracene, 1-(2-vinyl phenyl)anthracene, 2-(2-vinyl phenyl)anthracene, 9-(2-vinyl phenyl)anthracene and the like; vinyl phenyl phenanthrene compounds such as 1-(4-vinyl phenyl)phenanthrene, 2-(4-vinyl phenyl)phenanthrene, 3-(4-vinyl phenyl)phenanthrene, 4-(4-vinyl phenyl)phenanthrene, 9-(4-vinyl phenyl)phenanthrene, 1-(3-vinyl phenyl)phenanthrene, 2-(3-vinyl phenyl)phenanthrene, 3-(3-vinyl phenyl)phenanthrene, 4-(3-vinyl phenyl)phenanthrene, 9-(3-vinyl phenyl)phenanthrene, 1-(2-vinyl phenyl)phenanthrene, 2-(2-vinyl phenyl)phenanthrene, 3-(2-vinyl phenyl)phenanthrene, 4-(2-vinyl phenyl)phenanthrene, 9-(2-vinyl phenyl)phenanthrene and the like; vinyl phenyl pyrene compounds such as 1-(4-vinyl phenyl)pyrene, 2-(4-vinyl phenyl)pyrene, 1-(3-vinyl phenyl)pyrene, 2-(3-vinyl phenyl)pyrene, 1-(2-vinyl phenyl)pyrene, 2-(2-vinyl phenyl)pyrene and the like; vinyl terphenyl compounds such as 4-vinyl-p-terphenyl, 4-vinyl-m-terphenyl, 4-vinyl-o-terphenyl, 3-vinyl-p-terphenyl, 3-vinyl-m-terphenyl, 3-vinyl-o-terphenyl, 2-vinyl-p-terphenyl, 2-vinyl-m-terphenyl, 2-vinyl-o-terphenyl and the like; vinyl phenyl terphenyl compounds such as 4-(4-vinyl phenyl)-p-terphenyl and the like; vinyl alkyl biphenyl compounds such as 4-vinyl-4'-methyl biphenyl, 4-vinyl-3'-methyl biphenyl, 4-vinyl-2'-methyl biphenyl, 2-methyl-4-vinyl biphenyl, 3-methyl-4-vinyl biphenyl and the like; halogenated vinyl biphenyl compounds such as 4-vinyl-4'-fluoro biphenyl, 4-vinyl-3'-fluoro biphenyl, 4-vinyl-2'-fluoro biphenyl, 4-vinyl-2-fluoro biphenyl, 4-vinyl-3-fluoro biphenyl, 4-vinyl-4'-chloro biphenyl, 4-vinyl-3'-chloro biphenyl, 4-vinyl-2'-chloro biphenyl, 4-vinyl-2-chloro biphenyl, 4-vinyl-3-chloro biphenyl, 4-vinyl-4'-bromo biphenyl, 4-vinyl-3'-bromo biphenyl, 4-vinyl-2'-bromo biphenyl, 4-vinyl- 2-bromo biphenyl, 4-vinyl-3-bromo biphenyl and the like; alkoxy vinyl biphenyl compounds such as 4-vinyl-4'-methoxy biphenyl, 4-vinyl-3'-methoxy biphenyl, 4-vinyl-2'-methoxy biphenyl, 4-vinyl-2-methoxy biphenyl, 4-vinyl-3-methoxy biphenyl, 4-vinyl-4'-ethoxy biphenyl, 4-vinyl-3'-ethoxy biphenyl, 4-vinyl-2'-ethoxy biphenyl, 4-vinyl-2-ethoxy biphenyl, 4-vinyl-3-ethoxy biphenyl and the like, alkoxy carbonyl vinyl biphenyl compounds such as 4-vinyl-4'-methoxy carbonyl biphenyl, 4-vinyl-4'-ethoxy carbonyl biphenyl and the like; alkoxyalkyl vinyl biphenyl compounds such as 4-vinyl-4'-methoxymethyl biphenyl and the like; trialkylsilyl vinyl biphenyl compounds such as 4-vinyl-4'-trimethylsilyl vinyl biphenyl; trialkyl stannyl vinyl biphenyl compounds such as 4-vinyl-4'-trimethylstannyl biphenyl, 4-vinyl-4'-tributylstannyl biphenyl and the like; trialkyl silyl methyl vinyl biphenyl compounds such as 4-vinyl-4'-trimethylsilyl biphenyl and the like; aryl styrene compounds such as trialkyl stannyl methyl vinyl biphenyl compounds and the like such as 4-vinyl-4'-trimethyl-stannylmethyl biphenyl, 4-vinyl-4'-tributylstannylmethyl biphenyl and the like; halogen-substituted alkyl styrenes such as p-chloroethyl styrene, m-chloroethyl styrene, o-chloroethyl styrene and the like; alkoxy styrenes such as p-methoxy styrene, m-methoxy styrene, o-methoxy styrene, p-ethoxy styrene, m-ethoxy styrene, o-ethoxy styrene and the like; alkoxy carbonyl styrenes such as p-methoxy carbonyl styrene, m-methoxy carbonyl styrene and the like; acyloxy styrenes such as acetyloxy styrene, ethanoyloxy styrene, benzoyloxy styrene and the like; alkyl ether styrenes such as p-vinyl benzyl propyl ether and the like; alkyl silyl styrenes such as p-trimethylsilyl styrene and the like; alkyl stannyl styrenes such as p-trimethylstannyl styrene, p-tributylstannyl styrene, p-triphenylstannyl styrene and the like; vinyl styrenes such as ethyl vinyl benzene sufonate, vinyl benzyl dimethoxy phosphide, p-vinyl styrene and the like; and so on.

Further, the $R^7$ in the structural formula [IV] denotes, like the $R^6$ in the structural formula [III], a hydrogen atom, halogen atom or substituent group containing at least either one kind of a carbon atom, oxygen atom, nitrogen atom, sulfur atom, phosphorus atom, selenium atom, silicon atom and tin atom and it is essential that at least one $R^7$ of the n $R^7$s is an aryl group having a hydrogen atom, an aryl group having a halogen atom or an aryl group having a substituent group containing at least either one kind of a carbon atom, oxygen atom, nitrogen atom, sulfur atom, phosphorus atom, selenium atom, silicon atom and tin atom. And, n denotes an integer of 1 to 5.

Incidentally, particular examples of the substituent group of the $R^7$ include the same ones as those given in the case of the above mentioned $R^6$.

It is, however, essential that, as is mentioned above, at least one $R^7$ among the n $R^7$s is an aryl group having a hydrogen atom, an aryl group having a halogen atom or an aryl group having a substituent group containing at least either one kind of a carbon atom, oxygen atom, nitrogen atom, sulfur atom, phosphorus atom, selenium atom, silicon atom and tin atom. As to the aryl group having such a substituent group, the same ones are used as those given in the case of the above mentioned $R^6$.

In the present invention, the above described structural units [III] and [IV] are of different kind from each other and copolymers consisting of two kinds or more kinds of the structural units can be constituted by a variety of combinations thereof.

And, the above mentioned structural units [III] and [IV] not only denote a single kind alone but also denote two kinds or more of the structural units so that the copolymers of the present invention include, in addition to binary copolymers, multiple copolymers such as ternary copolymers, quaternary copolymers and so on.

The third embodiment of the present invention here is for those in which the content of the structural units [IV] is at least 0.1% by moles but not exceeding 20% by moles of the whole. Consequently, the range of temperature suitable for melt-molding is broad to give excellent moldability.

When the content of the structural unit [IV] is smaller than 0.1% by moles of the whole, the temperature suitable for melt-molding is narrow to cause a difficulty in molding.

On the other hand, the fourth embodiment of the present invention is for those in which the content of the structural unit [IV] exceeds 20% by moles but does not exceed 99.9% by moles of the whole. As a consequence, the glass transition point is high to give excellent heat resistance. When the content of the structural unit [IV] exceeds 99.9% by moles of the whole, the temperature suitable for melt-molding is rendered narrow although the heat resistance is improved.

The styrene-based copolymer of the present invention has the structural units (recurring units) described above while, furthermore, the stereospecificity thereof has a mainly syndiotactic configuration or, namely, a steric structure in which the substituted phenyl groups are positioned alternately at opposite directions relative to the main chain formed by the carbon-to-carbon linkage and the tacticity thereof can be quantitatively determined by the method of nuclear magnetic resonance (NMR method).

In particular, it is performed by the analysis of the $C_1$-carbon signals and methyne-methylene carbon signals by the $^{13}C$-NMR method (spectra of the nuclear magnetic resonance method by the isotopic carbon) or the proton signals by the $^1H$-NMR. The tacticity quantitatively determined by NMR can be expressed by the proportion of occurrence of a plural number of the structural units in a continuous sequence (namely, the proportion of occurrence of the relationship of a relative steric conformation of the structural units in a continuous sequence) such as diads in the case of two units, triads in the case of three units and pentads in the case of five units while those having a mainly syndiotactic configuration implied in the present invention usually indicate those having such a syndiotacticity that, relative to the continuous chain of the styrene-based recurring units, the racemic diad is at least 75% or, preferably, at least 85% or the racemic pentad is at least 30% or, preferably, at least 50%.

In the styrene-based copolymer of the present invention, the syndiotactic configuration (co-syndiotactic configuration) is formed not only between the structural units [III] and between the structural units [IV] connected together but also between the structural units of [III] and [IV]. And, this copolymer includes various types of embodiments such as block copolymerization, random copolymerization, alternating copolymerization and the like of the structural units [III] and [IV].

Incidentally, the styrene-based copolymer of the mainly syndiotactic configuration is not always necessarily a single copolymer. Provided that the syndiotacticity is within the above mentioned range, it can be any of mixtures with a styrene-based copolymer of the isotactic or atactic configuration or built into the polymeric chain. And, the styrene-based copolymer of the present invention can be a mixture of those having different molecular weights designating those having a degree of polymerization of at least 5 or, preferably, at least 10. The weight-average molecular weight is, preferably, from 5,000 to 1,000,000 or, more preferably, from 8,000 to 800,000. The molecular weight distribution is not particularly limitative.

The styrene-based copolymer of the third or the fourth embodiments of the present invention as described above can be efficiently prepared, for example, by the method of the fifth of the present invention.

Namely, the fifth embodiment of the present invention is characterized by effecting the copolymerization of the styrene-based monomer represented by the above given general formula [V] and the aryl styrene-based monomer represented by the above given general formula [VI] (excepting those identical with the styrene-based monomer represented by the above given general formula [V]) by using, as the catalytic ingredients, (A) a transition metal ingredient and (B) a contacting product of an organoaluminum compound and a condensation agent.

In other words, using two kinds or more of the styrene-based monomers including at least one kind of the styrene-based monomers represented by the above given general formula [V] and the aryl styrene-based monomer represented by the above given general formula [VI] as the starting materials, they are copolymerized in the presence of a catalyst consisting of (A) a transition metal ingredient and (B) a contacting product of an organoaluminum compound and a condensation agent.

The transition metal compound as the ingredient (A) of the catalyst here includes various ones but it is preferably at least one kind of the compounds selected from the transition metal compounds represented by the above given general formula [VII], [VIII], [IX] or [X]. Among these transition metal compounds, it is preferable to use one of which the $M^1$ in the above given general formula [VII] is titanium or zirconium.

These transition metal compounds as the ingredient (A) of the catalyst are as already described in the method of the second of the present invention.

On the other hand, (B) the contacting product of an organoaluminum compound and a condensation agent as the other ingredient of the catalyst used in the method of the fifth of the present invention is, for example, of the same kind as those described in the official publication of Japanese Patent Kokai No. 62-187708 and also as described in the method of the second of the present invention.

The catalyst used in the method of the fifth embodiment of the present invention consists of the above mentioned ingredients (A) and (B) as the principal constituents and, besides the above mentioned, it is optional according to desire to add other catalytic ingredients such as, for example, a trialkyl aluminum represented by the general formula $$AlR^{22}_3$$

[in the formula, $R^{22}$ denotes an alkyl group having 1 to 8 carbon atoms] or other organometallic compounds and the like.

In the fifth embodiment of the present invention, a styrene-based monomer and an aryl styrene-based monomer are copolymerized by using the catalyst obtained in the above described manner and any of the methods such as bulk polymerization, solution polymerization, suspension polymerization and the like can be used as the polymerization method. And, in these cases, aliphatic hydrocarbons such as pentane, hexane, heptane and the like, alicyclic hydrocarbons such as cyclohexane and the like and aromatic hydrocarbons such as benzene, toluene, xylene and the like are used as the solvent. Among them, aromatic hydrocarbons are preferable, and toluene and xylene are particularly preferable. In this case, the proportion of monomer/solvent can be freely selected.

And, the conditions of the polymerization are not particularly limitative but, usually, the polymerization temperature is from 0° to 120° C. or, preferably, from 10° to 80° C. and the polymerization time is from 5 minutes to 24 hours or, preferably, at least 1 hour.

Further, it is effective to conduct in the presence of hydrogen in order to control the molecular weight of the styrene-based copolymer to be obtained.

In the use of this catalyst, furthermore, it is difficult to definitely select the proportion of the ingredient (A) and the ingredient (B) in the catalyst because of the dependency thereof on the kinds of the respective ingredients, kinds of the styrene-based monomer and aryl styrene-based monomer as the starting materials and other conditions but, usually, it is from 1/1 to $10^6/1$ (molar ratio) or, preferably, from 10/1 to $10^4/1$ (molar ratio) as the proportion of the aluminum in the catalytic ingredient (B) and the transition metal in the transition metal ingredient (A) or, namely, aluminum/transition metal (molar ratio).

And, the proportion of the starting materials introduced is not particularly limitative and can be selected depending on the composition of the desired product. Furthermore, the order of introduction of the starting materials and the catalytic ingredients is not particularly limitative and can be performed in any desired order.

In the above described manner, the styrene-based copolymer of the third or fourth embodiments of the present invention can be prepared. This copolymer has a high syndiotacticity as is mentioned above but a high-purity styrene-based copolymer having an extremely high syndiotacticity can be obtained by undertaking, after the polymerization, a deashing treatment with a washing liquid containing hydrochloric acid and the like according to need followed, through further washing and drying under reduced pressure, by removal of the soluble matter by washing with a solvent such as methyl ethyl ketone and the like.

In the next place, the present invention is described in detail by way of examples.

EXAMPLE 1

(1) Preparation of a methyl aluminoxane

Into a glass-made vessel of 500 ml capacity after replacement with argon were introduced 200 ml of toluene, 17.7 g (71 mmoles) of copper sulfate pentahydrate ($CuSO_4 \cdot 5H_2O$) and 24 ml (250 mmoles) of trimethyl aluminum to be reacted at 40° C. for 8 hours. Thereafter, the solid material was removed and the thus obtained solution was freed from toluene by distillation under reduced pressure to give 6.7 g of a contacting product. This material had a molecular weight of 610 as determined by the cryoscopic method.

And, the high magnetic field component by the $^1$H-NMR measurement or, namely, the proton nuclear magnetic resonance spectrum thereof is observed in toluene solvent under room temperature to find the methyl proton signal due to the (Al—$CH_3$) linkage in the range from 1.0 to −0.5 ppm with reference to tetramethyl silane. Since the (0 ppm) in the proton signal of tetramethyl silane is found within the observation region due to the methyl proton due to the Al—$CH_3$ linkage, the methyl proton signal due to this Al—$CH_3$ linkage was measured with reference to the methyl proton signal 2.35 ppm in the tetramethyl silane reference and divided into the high magnetic field component (namely, from −0.1 to −0.5 ppm) and other magnetic field component (namely, from 1.0 to −0.1 ppm) to find that the high magnetic field component was 43% of the whole.

(2) Preparation of poly(4-vinyl biphenyl) (polyparaphenyl styrene) having a syndiotactic configuration Under an atmosphere of argon, 2 ml of toluene, $8 \times 10^{-4}$ mole (2 moles/liter toluene solution) of triisobutyl aluminum (TIBA) and $8 \times 10^{-4}$ mole (2.6 moles/liter toluene solution) of the methyl aluminoxane obtained in the above described (1) as the catalytic ingredient (B) were added at room temperature to a dried reaction vessel and thereafter kept at 70° C. Into this reaction solution were added $4 \times 10^{-6}$ mole (0.01 mole/liter toluene solution of 1,2,3,4,5-pentamethyl cyclopentadienyl titanium trimethoxide (Cp*Ti(OMe)$_3$) as the catalytic ingredient (A) and 0.88 ml ($8.8 \times 10$ mole) of a solution of (4-vinyl biphenyl) (p-phenyl styrene) prepared as a 1 mole/liter toluene solution to be reacted for 2 hours.

Thereafter, the reaction product was added to a mixed solution of methyl alcohol and hydrochloric acid to effect termination of the reaction, deashing and filtered followed by three times of washing with methyl alcohol. Drying under reduced pressure gave 0.15 g of a polymer. The molecular weight thereof was determined by the gel permeation chromatography (G.P.C.) to find that the weight-average molecular weight (Mw) was 96,000 and the number-average molecular weight (Mn) was 32,000. Incidentally, the conditions in the G.P.C. determination were as follows.

Instrument: Produced by Waters Company, ALS/GPC 150C.
Column: TSK HM+GMH6×2
Temperature: 135° C.
Solvent: 1,2,4-trichlorobenzene (TCB)
Flow rate: 1.0 ml/minute Further, this poly(4-vinyl biphenyl) was subjected to extraction for 4 hours with methyl ethyl ketone as the solvent by using a Soxhlet extractor to find 99% by weight of insoluble matters.

Further, this polymer had a melting point of 344° C. as determined by the differential scanning calorimetric measurement indicating that it was a crystalline polymer (rate of temperature elevation 20° C./minute, fast heating).

FIG. 1 shows the result of the $^{13}$C-NMR (100 MHz) measurement of the polymer obtained in Example 1.

Figure 2:
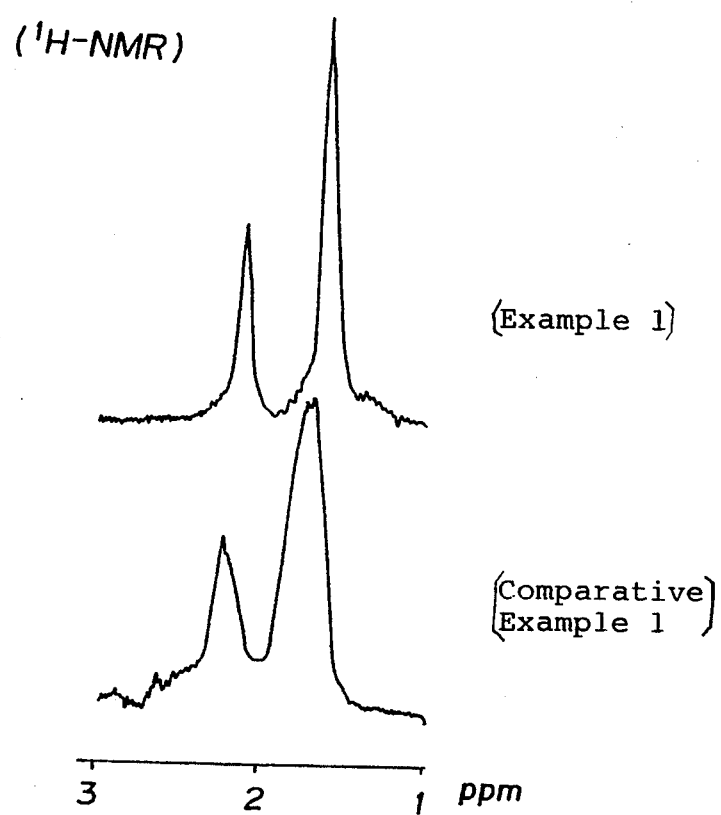
FIG. 2 is a spectral chart illustrating the results of the $^1$H-NMR (400 MHz, solvent: TCB) measurements of the polymers obtained in Example 1 and Comparative Example 1.

And, FIG. 2 shows the result of the $^1$H-NMR (400 MHz, solvent: TCB) measurement of the polymer obtained in Example 1.

Figure 3:
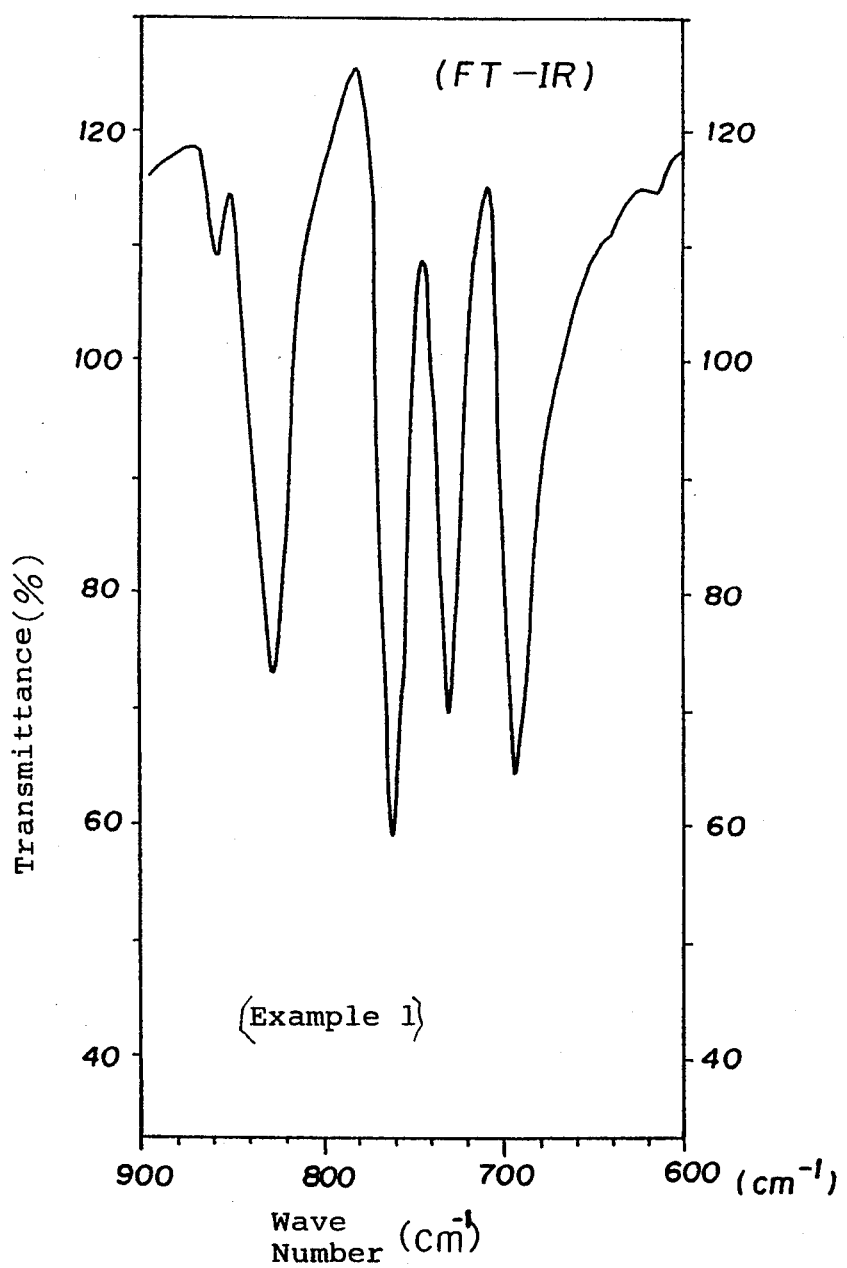
FIG. 3 is a spectral chart of the result of the IR measurement of the polymer obtained in Example 1.

Further, FIG. 3 shows the result of the infrared absorption spectrometric (IR) measurement of the polymer obtained in Example 1.

From FIG. 1 to FIG. 3, it is understood that this polymer has a mainly syndiotactic configuration.

In addition, furthermore, it is understood from the half-value width of the peak of the poly(p-phenyl styrene) shown in FIG. 1 (Example 1) that this polymer has at least 95% of the racemic diads and at least 80% of the racemic pentads.

COMPARATIVE EXAMPLE 1

Radical polymerization of 4-vinyl biphenyl (p-phenyl styrene) was conducted by using azobisisobutyronitrile (AIBN).

This polymer was identified to be a non-crystalline polymer without showing a melting point from the differential scanning calorimetry. And, this polymer was soluble in methyl ethyl ketone.

FIG. 1 shows the result of the $^{13}$C-NMR (100 MHz) measurement of the polymer obtained in Comparative Example 1.

And, FIG. 2 shows the result of the $^1$H-NMR (400 MHz, solvent: TCB) measurement of the polymer obtained in Comparative Example 1.

Figure 4:
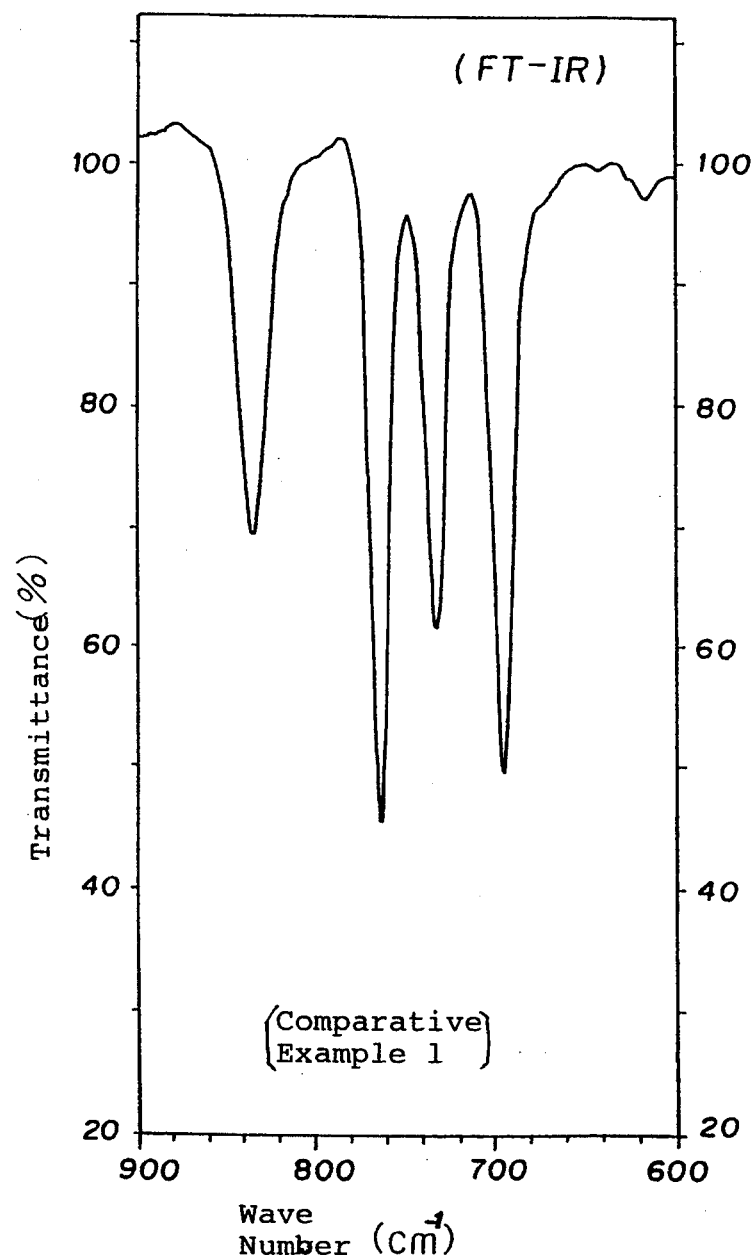
FIG. 4 is a spectral chart illustrating the result of the IR measurement of the polymer obtained in Comparative Example 1.
Figure 5:
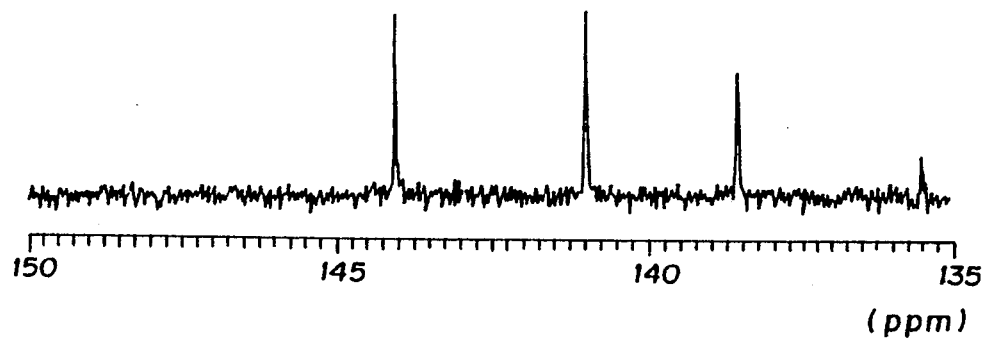
FIGS. 5(a) and (b) are each a chart showing the result of the $^{13}$C-NMR measurement of the copolymer obtained in Reference Example 1.
Figure 5:
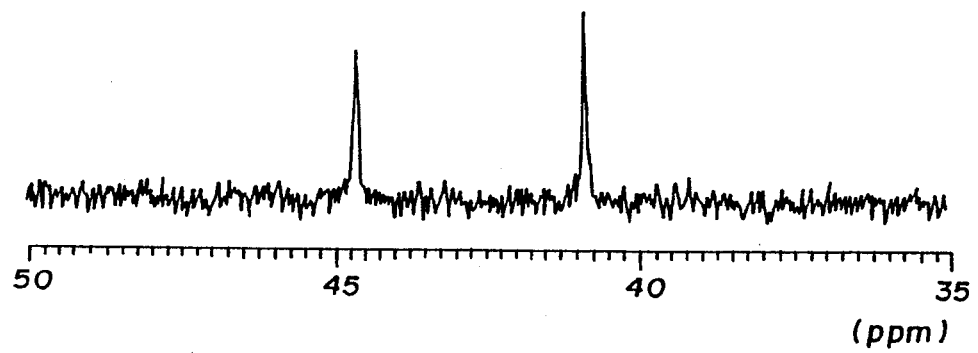
Figure 6:
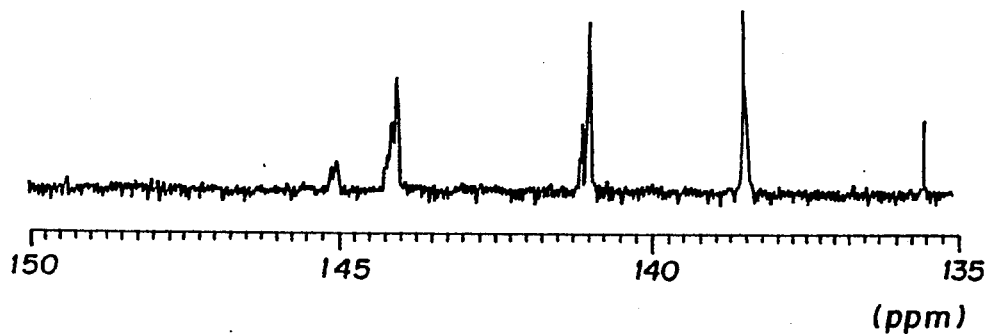
FIGS. 6(a) and (b) are each a chart showing the result of the $^{13}$C-NMR measurement of the copolymer obtained in Example 2.
Figure 6:
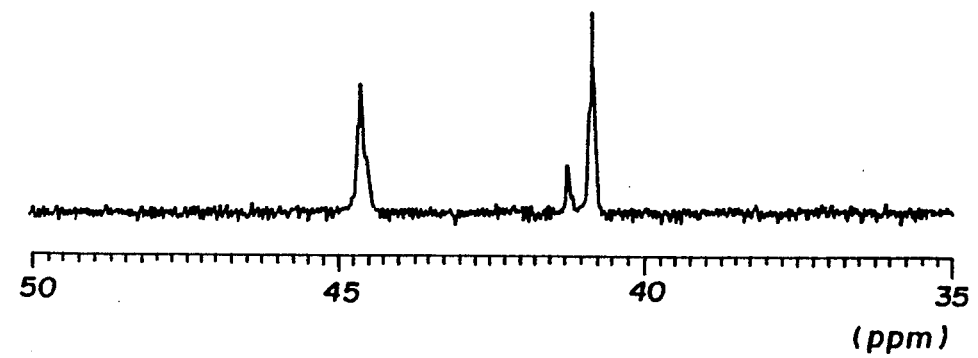
Figure 7:
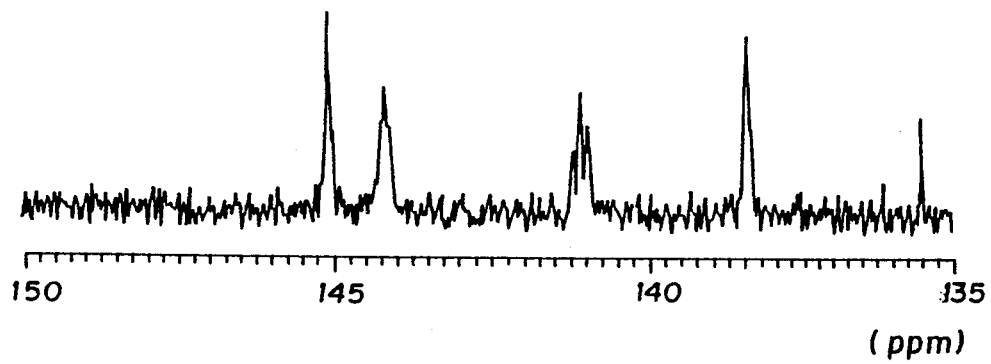
FIGS. 7(a) and (b) are each a chart showing the result of the $^{13}$C-NMR measurement of the copolymer obtained in Example 3.
Figure 7:
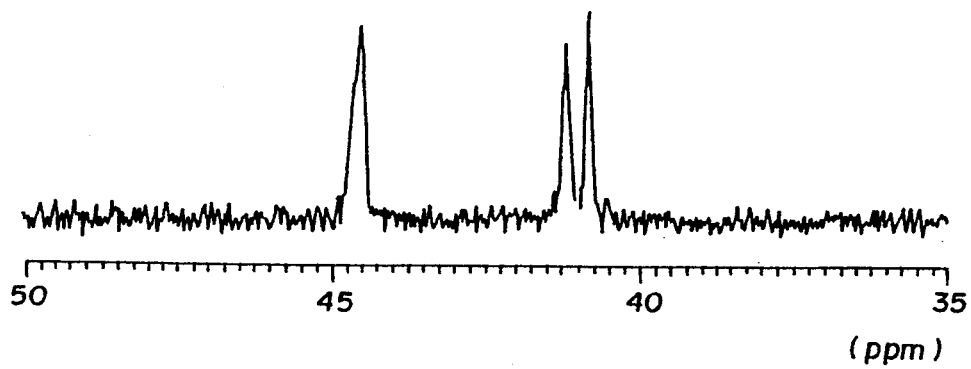
Figure 8:
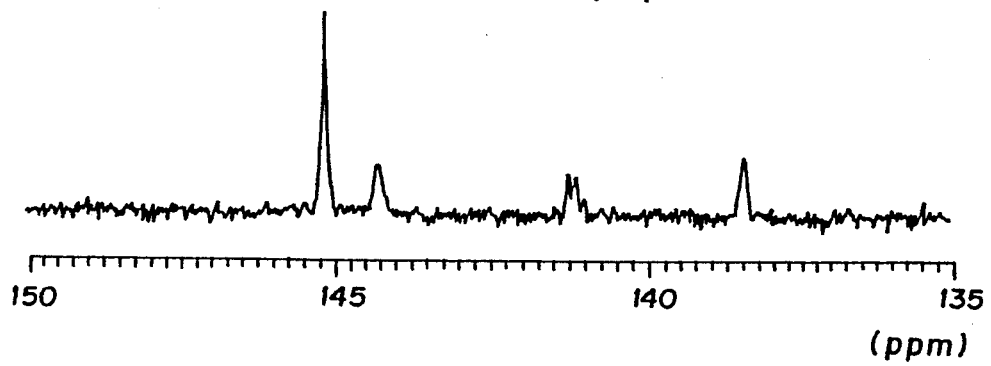
FIGS. 8(a) and (b) are each a chart showing the result of the $^{13}$C-NMR measurement of the copolymer obtained in Example 4.
Figure 8:
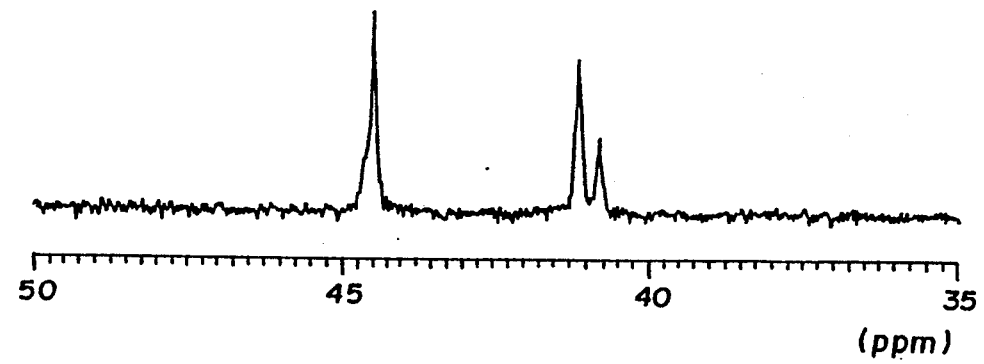
Figure 9:
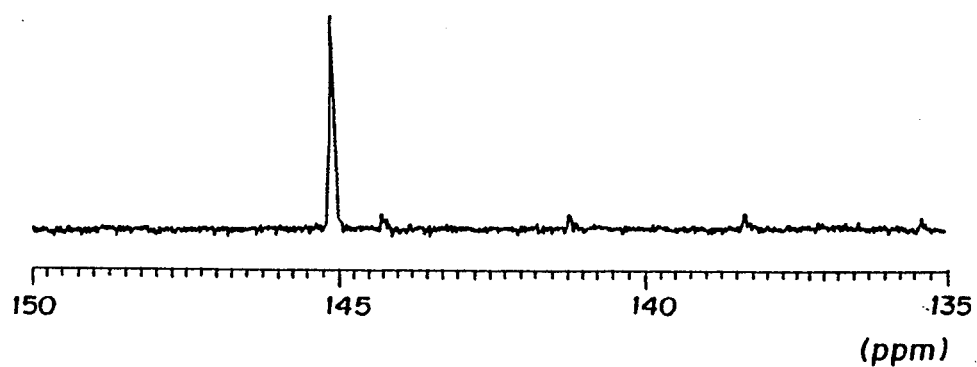
FIGS. 9(a) and (b) are each a chart showing the result of the $^{13}$C-NMR measurement of the copolymer obtained in Example 6.
Figure 9:
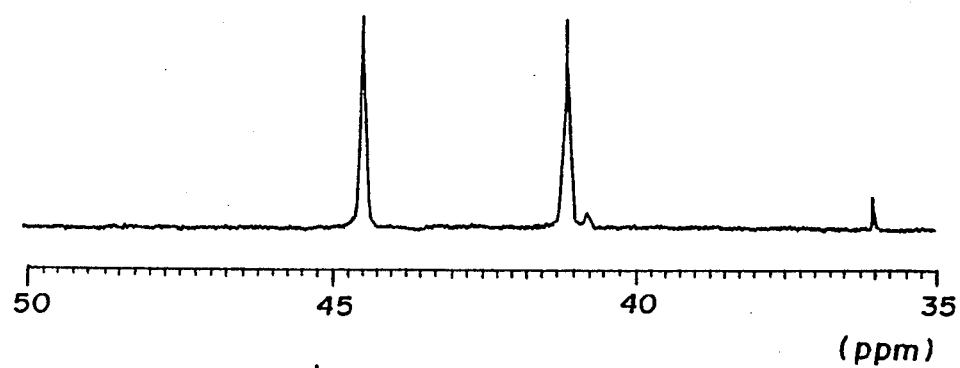
Figure 10:
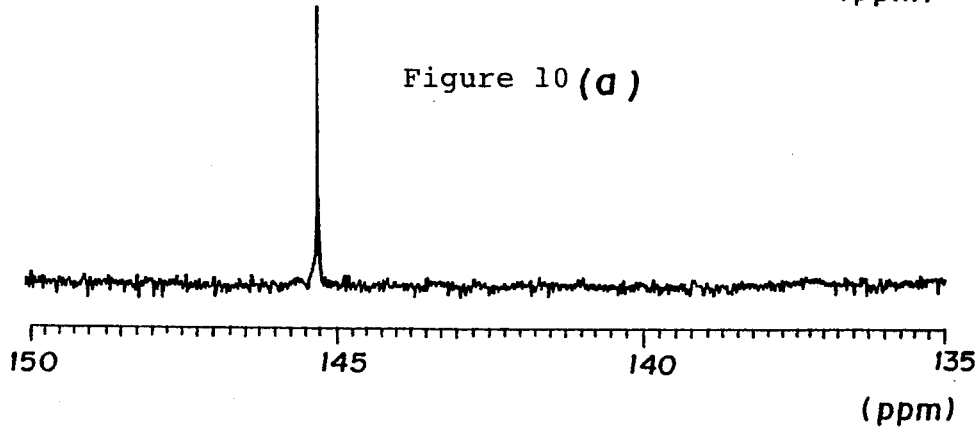
FIGS. 10(a) and (b) are each a chart showing the result of the $^{13}$C-NMR measurement of the copolymer obtained in Reference Example 2.
Figure 10:
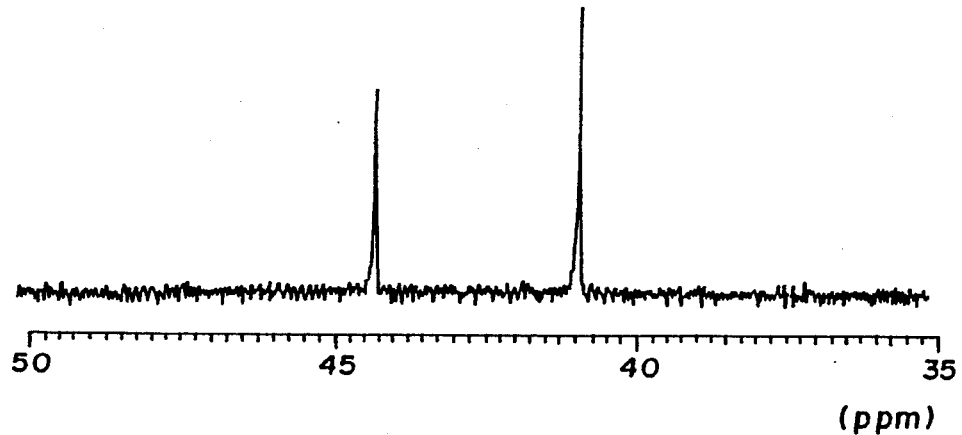
Figure 11:
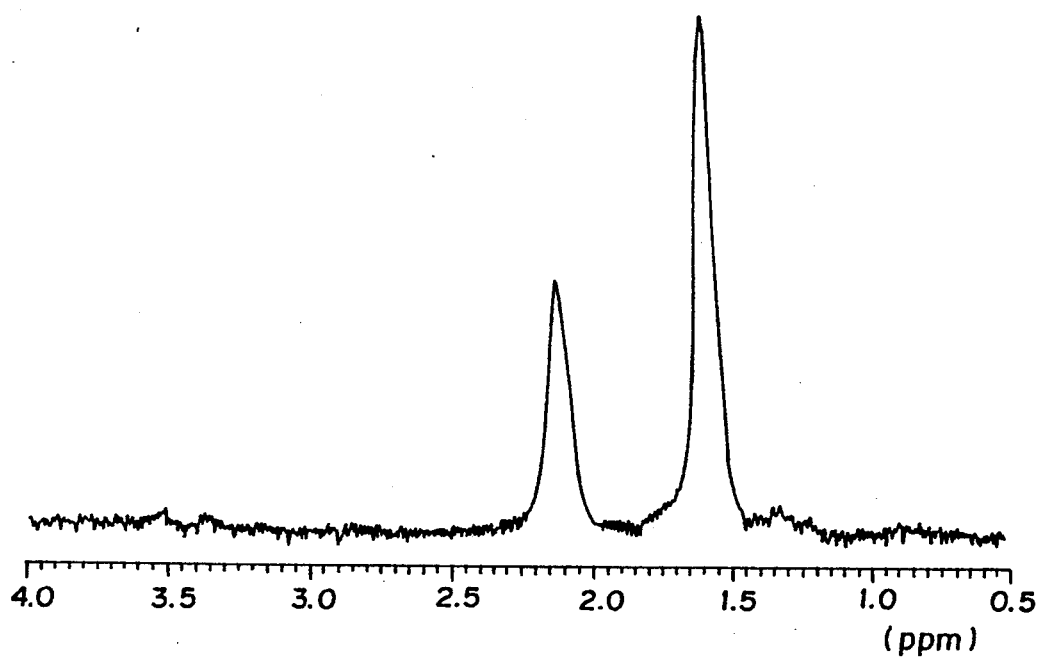
FIGS. 11 to 15 are each a chart showing the result of the $^1$H-NMR measurement of the copolymer obtained in Reference Example 1, Example 2, Example 3, Example 4 and Example 6, respectively.
Figure 12:
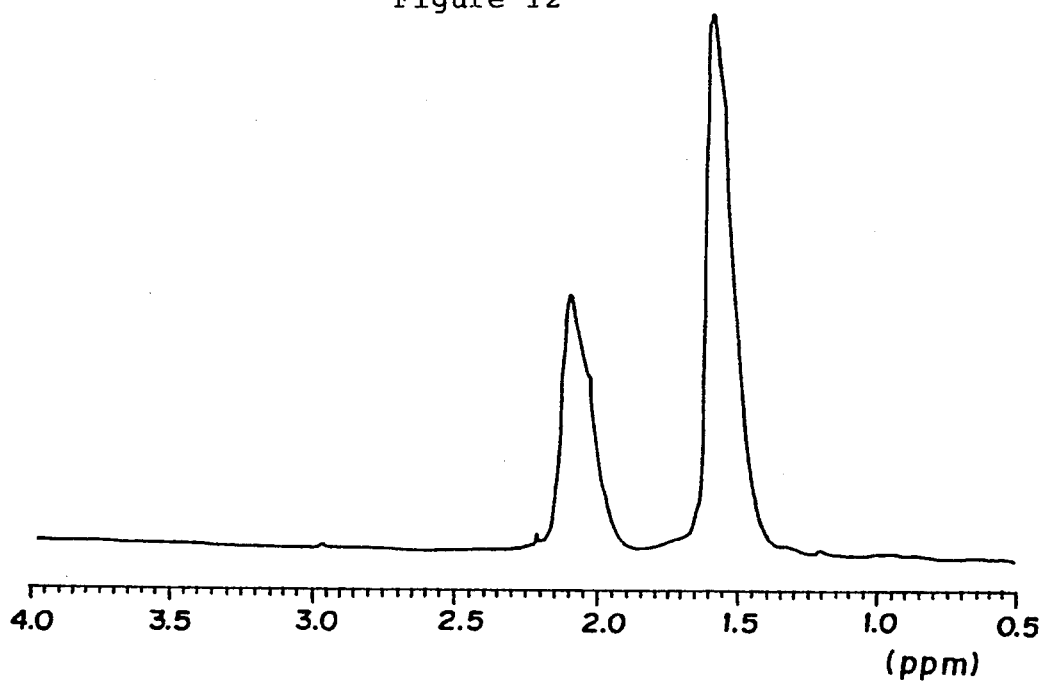
Figure 13:
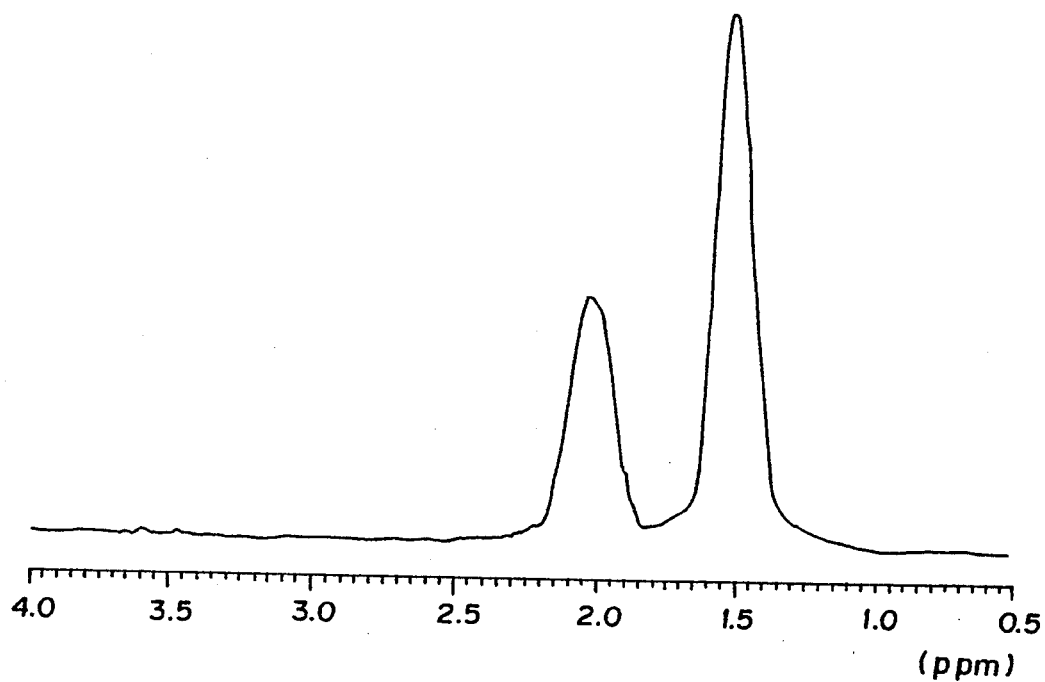
Figure 14:
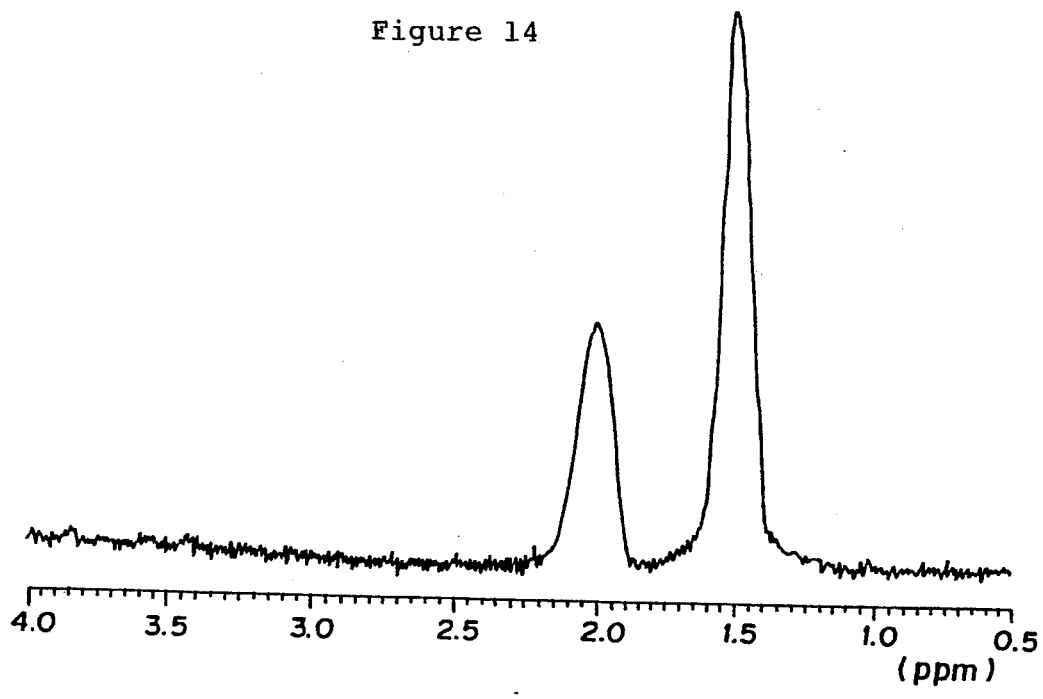
Figure 15:
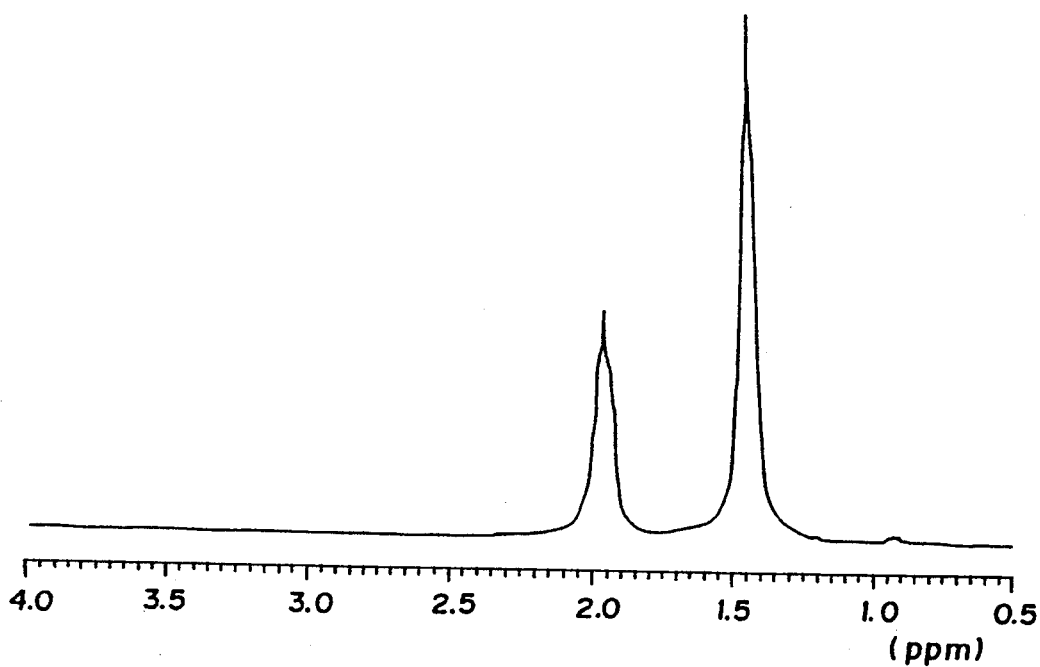

Further, FIG. 4 shows the result of the IR measurement of the polymer obtained in Comparative Example 1.

It is concluded from FIGS. 1, 2 and 4 that this polymer has an atactic configuration.

Following is the conclusion from the results of the measurements of Example 1 and Comparative Example 2 above.

Incidentally, the graphs in the upper half and in the lower half of FIG. 1 show the cases of Example 1 and Comparative Example 1, respectively.

The peaks at 40.83 and 44.64 ppm in the graph of Example 1 can be assigned to the carbon atoms in methyne and methylene of the main chain, respectively, and the peaks at 138.56, 140.97 and 144.02 ppm can be assigned to either one of the quaternary carbon atoms in the side chain biphenyl ring.

The graph in the upper half of this FIG. 1 shows, when comparison is made with that of the atactic configuration obtained in Comparative Example 1 in the lower half, that the peaks are very sharp indicating stereospecific orientation of the main chain.

And, in FIG. 2, the graph in the upper half and the graph in the lower half show the cases of Example 1 and Comparative Example 1, respectively. The values of the chemical shift due to the methyne and methylene in the main chain in Example 1 each show a shift toward a higher magnetic field than the values of the chemical shift in Comparative Example 1 (atactic configuration). According to J. Polym. Sci., Part A-1, 5, 2323 (1967), on the other hand, the values of the chemical shift due to the main chain methyne and methylene in a poly(p-phenyl styrene) having an isotactic configuration each show a shift toward a lower magnetic field than those of the atactic configuration. From these facts, accordingly, it could be evidenced that one obtained in Example 1 had a syndiotactic configuration.

According to FIG. 3, furthermore, a novel peak was found therein at a position of 860 cm$^{-1}$ (11.6 μm) not seen in poly(p-phenyl styrene) having an isotactic configuration [J. Polym. Sci., Part A-1, 5, 2323 (1967)]. This fact also indicates that the polymer obtained in Example 1 has neither an atactic configuration nor an isotactic configuration but has a syndiotactic configuration.

EXAMPLE 2

Preparation of a copolymer and styrene and 4-vinyl biphenyl having a co-syndiotactic configuration Into a dried reaction vessel under an atmosphere of argon at room temperature were introduced 2 ml of toluene, $8 \times 10^{-4}$ mole (2 moles/liter—toluene solution) of TIBA (triisobutyl aluminum) and $8 \times 10^{-4}$ mole (2.6 moles/liter—toluene solution) of the methyl aluminoxane obtained in Example 1(1) as the catalytic ingredient (B) and kept thereafter at a temperature of 70° C. This reaction solution was admixed with $4 \times 10^{-6}$ mole (0.01 mole/liter—toluene solution) of 1,2,3,4,5-pentamethyl cyclopentadienyl titanium trimethoxide [Cp*Ti(OMe)$_3$] as the catalytic ingredient (A) and 8.75 ml of a mixed solution of 4-vinyl biphenyl and styrene [4-vinyl biphenyl/styrene=8/2 (ratio of charged monomers)]

prepared in advance as a 1 mole/liter toluene solution (total of monomers 8.75×10⁻³ mole) to effect the reaction for 2 hours.

Thereafter, the reaction product was poured into a mixture of methyl alcohol and hydrochloric acid to effect termination of the reaction and deashing and filtered followed by three times of washing with methyl alcohol. This was dried under reduced pressure to give 0.59 g of a copolymer of styrene and 4-vinyl biphenyl.

The molecular weight of this copolymer was measured by the gel permeation chromatography (GPC) to Temperature: 135° C.
Solvent: TCB
Poured volume: 400 μl

EXAMPLES 3 TO 7 AND EXAMPLE 1 (2) AND REFERENCE EXAMPLE 1

It was conducted in the same manner as in Example 2 except that the ratio of the monomer charge of 4-vinyl biphenyl/styrene was 5/5, 4/6, 3/7, 1/9, 0.5/9.5, 10/0 or 0/10, respectively.

The results are shown in Table 1.

TABLE 1

| | 4-Vinyl biphenyl/styrene molar ratio of monomer charge | Yield (g) | MEK extraction residue (%) | Composition ratio of product 4-vinyl biphenyl/styrene | From DSC $T_g$ (°C.) | From DSC $T_m$ (°C.) | From TG $T_d$ (°C.) | *¹ $T_d$-$T_m$ (°C.) | $M_w$*² (× 10⁴) | $M_w$*² (× 10⁴) | $M_w/M_n$ |
|---|---|---|---|---|---|---|---|---|---|---|---|
| Example 1(2) | 10/0 | 1.51 | 99 | 100/0 | 196 | 352 | 412 | 60 | 18 | 6.1 | 3.0 |
| Example 2 | 8/2 | 0.59 | 98 | 67/33 | 143 | 294 | 417 | 123 | 12 | 4.8 | 2.4 |
| Example 3 | 5/5 | 0.42 | 32 | 38/62 | 128 | — | 413 | — | 7.2 | 2.5 | 2.9 |
| Example 4 | 4/6 | 0.30 | 17 | 25/75 | 108 | — | 414 | — | 5.4 | 2.6 | 2.0 |
| Example 5 | 3/7 | 0.29 | 0 | 21/79 | 106 | — | 410 | — | 5.0 | 2.4 | 2.1 |
| Example 6 | 1/9 | 0.25 | 89 | 13/87 | 94 | 214 | 412 | 198 | 4.5 | 2.2 | 2.0 |
| Example 7 | 0.5/9.5 | 0.18 | 97 | 10/90 | 96 | 239 | 410 | 171 | 7.9 | 3.8 | 2.1 |
| Reference Example 1 | 0/10 | 0.90 | 99 | 0/100 | 99 | 267 | 408 | 141 | 9.8 | 4.7 | 2.1 |

*¹: Range of temperature suitable for melt molding
*²: Calculated as polystyrene find that the weight-average molecular weight (Mw) was 1.2×10⁵ calculated as a polystyrene (PS) and the number-average molecular weight (Mn) was 4.8×10⁻⁴ calculated as a PS. This copolymer was subjected to 4 hours of extraction with methyl ethyl ketone (MEK) as the solvent by using a Soxhlet extractor to find 98% by weight of the insoluble fraction.

And, the glass transition point (Tg) and melting point (Tm) of this copolymer determined by the differential scanning calorimetric measurement (DSC) were 143° C. and 294° C., respectively, and the thermal decomposition temperature (Td) determined by the thermogravimetric measurement [Td implied here means the temperature at the intersection of the tangent line at the point before decomposition (d(TG)/dt=0) and the tangent line at the inflection point during decomposition on the TG (thermogravimetric change) curve] was 417° C. And, the composition ratio of this copolymer was 4-vinyl biphenyl/styrene=67/33 as determined by the calibration curve method of infrared absorption spectrum [mixtures of a poly(4-vinyl biphenyl) obtained by the radical polymerization and a polystyrene having a syndiotactic configuration synthesized by a known method uniformly blended in specified amounts were prepared and the respective infrared absorption spectra were measured to obtain the peak intensity ratio of the absorption at 696 cm⁻¹ and the absorption at 814 cm⁻¹ and a calibration curve was prepared from the mixing ratios and the peak intensity ratios to determine the composition ratio of the copolymer by means of this calibration curve and the peak intensity ratio of the absorption at 696 cm⁻¹ and the absorption at 814 cm⁻¹ of the copolymer obtained). The results of these measurements are shown in Table 1.

Incidentally, the conditions of the GPC measurement were as shown below.
Instrument: Produced by Waters Company, ALC/GPC 150C
Column: TSK HM+GMH 6×2
Flow rate: 1.0 ml/minute Confirmation of the configuration of copolymer In the next place, it was confirmed by the following methods that the styrene-based copolymers obtained in Examples 2 to 7 had a co-syndiotactic configuration.

(1) Results of the ¹³C-NMR measurement

FIG. 5 to FIG. 10 show the results of the ¹³C-NMR measurements [100 MHz, solvent: 1,2,4-trichlorobenzene/heavy benzene=8/2 (molar ratio)] of the polymers obtained in Reference Example 1, Examples 2, 3, 4 and 6 and Reference Example 2, respectively.

In FIG. 5(a), the three sharp peaks (138.6, 141.0 and 144.0 ppm) indicate three kinds of the quaternary carbon atoms in the syndiotactic poly(4-vinyl biphenyl) and the two sharp peaks (40.8 and 44.6 ppm) in FIG. 5(b) indicate the methyne and methylene carbon atoms, respectively.

And, the sharp peak (145.1 ppm) in FIG. 10(a) indicates the quaternary carbon atom of the syndiotactic polystyrene and the two sharp peaks (41.0 and 44.3 ppm) in FIG. 10(b) indicate the methyne and methylene carbon atoms, respectively.

It is understood from FIG. 5 to FIG. 10 that new peaks appear by the copolymerization with variation in the peak intensity ratios indicating that these copolymers have a cosyndiotactic configuration.

(2) Results of the ¹H-NMR measurement

FIG. 11 to FIG. 15 show the results of the ¹H-NMR measurements (400 MHz) obtained in Reference Example 1 and Examples 2, 3, 4 and 6, respectively.

It can be evidenced from these figures that methyne and methylene each have only a single peak corresponding thereto and that they are each a copolymer from the shift of the value of chemical shift as confirmed.

(3) Molecular weight distribution

The molecular weight distribution in Examples 2 to 7 has a single peak in the GPC suggestively indicating that they are each a copolymer.

(4) Monomer reactivity ratios

It is known that the monomer reactivity ratios $r_1$ and $r_2$ give an important index to indicate the distribution of monomer chains in a copolymer chain ["Copolymerization" I; Reaction Analysis, pages 6–8, edited by Polymer Science Association].

The monomer reactivity ratios ($r_1$=styrene and $r_2$=4-vinyl biphenyl) were determined from the proportion of the charged monomers and the composition of the copolymer obtained to find that the product thereof $r_1 \cdot r_2$ was smaller than 1.

This means that the copolymers obtained in Examples 2 to 7 are each a random copolymer and further supports the result of the signals of the aromatic ring quaternary carbon atom in the $^{13}$C-NMR.

To evaluate the results of (1), (2), (3) and (4) above inclusively, the styrene-based copolymers obtained in Examples 2 to 7 had a substantially co-syndiotactic steric configuration and the tacticity thereof was at least 95% in the racemic diads and at least 80% in the racemic pentads as a conclusion.

EXAMPLE 8

(1) Preparation of m-phenyl styrene

With agitation under a stream of an inert gas, a drop of 1,2-dibromoethane was added to a solution of 1.70 g (0.07 mole) of granular metallic magnesium in diethyl ether (100 ml) and the Grignard reagent reaction was initiated by heating.

The liquid temperature was increased until refluxing took place and then a solution of 7.37 g (0.07 mole) of bromobenzene in diethyl ether (70 ml) was gradually added dropwise taking 30 minutes. After completion of the dropwise addition, it was kept as such for 1 hour under reflux. The reaction solution was cooled to room temperature and it was added at room temperture to a solution of 6.51 ml (0.05 mole) of m-bromostyrene and 0.32 g (0.6 m mole) of a nickel chloride-(1,3-diphenyl phosphino propane) complex in diethyl ether (100 ml). After completion of the dropwise addition, refluxing was continued for 4 hours. The reaction solution was poured into 500 ml of ice water and the pH was adjusted to be weakly acidic. Extraction with hexane was undertaken and, through washing, drying, removal of the solvent by distillation and purification by the silica gel column chromatography, 7.32 g of m-phenyl styrene (yield 80%) were obtained.

The results of the 1H-NMR measurement (solvent heavy chloroform, 90 MHz) were as follows.

δ5.26 (2H, dd, HC=C-[trans])
δ5.80 (2H, dd, HC=C-[cis])
δ6.78 (1H, dd, C=CH-[α position]
δ7.00 to 7.90 (9H, benzene ring)

(2) Preparation of a p-phenyl styrene/m-phenyl styrene copolymer having a co-syndiotactic configuration.

Into a dried reaction vessel under an atmosphere of argon at room temperature were introduced 2 ml of toluene, $4 \times 10^{-4}$ mole (2.0 moles/liter-toluene solution) of triisobutyl aluminum and $4 \times 10^{-4}$ mole (2.6 moles/liter-toluene solution) of the methyl aluminoxane obtained in Example 1(1) as the catalytic ingredient (B) and into this reaction solution at 70° C. were added $2 \times 10^{-6}$ mole (0.01 mole/liter-toluene solution) of 1,2,3,4,5-pentamethyl cyclopentadienyl titanium trimethoxide (Cp*Ti(OMe)$_3$) as the catalytic ingredient (A) and a mixed solution of p-phenyl styrene and m-phenyl styrene (obtained in (1) described above prepared as a 1 mole/liter-toluene solution [p-phenyl styrene/m-phenyl styrene=95/5 (ratio of monomer charge), total of the monomers $8.75 \times 10^{-3}$ mole] to effect the reaction for 4 hours.

Thereafter, the reaction product was put into a mixed solution of methyl alcohol and hydrochloric acid to effect termination of the reaction and deashing and, after filtration, further washed three times with methyl alcohol. This was dried under reduced pressure to give 0.90 g of a p-phenyl styrene/m-phenyl styrene copolymer.

The molecular weight of this copolymer was determined by the gel permeation chromatography (GPC) to find that the weight-average molecular weight (Mw) was 1,000,000 calculated as polystyrene (PS) and the number-average molecular weight was 230,000 calculated as PS.

Incidentally, the conditions of the GPC measurement were as shown below.

Instrument: Produced by Waters Company, ALC/GPC 150C
Column: TSK HM+GMH 6×2
Flow rate: 1.0 ml/minute
Temperature: 135° C.
Solvent: TCB
Poured volume: 400 μl Further, this copolymer was subjected to the measurement of differential scanning calorimetry (DSC) [conditions of measurement: temperature elevation (fast heating) from 30° to 360° C. at 20° C./minute] to find that the glass transition point (Tg) of this copolymer was 160° C. and the melting point (Tm) was 335° C. while the decomposition temperature (Td) determined by the thermogravimetric measurement was 416° C. [Td here implied indicates the temperature at the intersection of the tangent line at the point before the decomposition (d(TG)/dt=0) and the tangent line at the inflection point during the decomposition].

Figure 16:
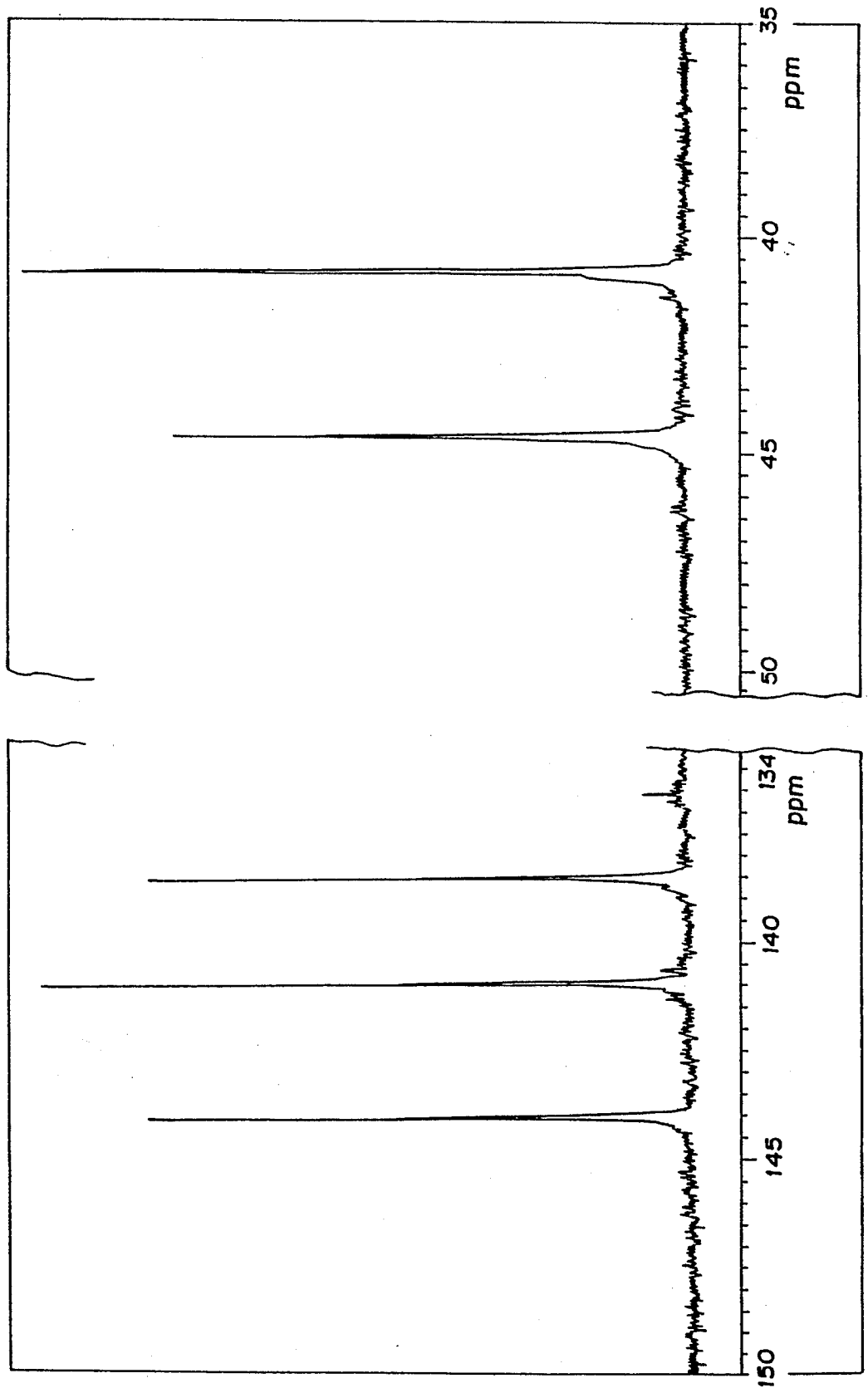
FIGS. 16 to 20 are each a chart showing the result of the $^{13}$C-NMR measurement of the copolymer obtained in Examples 8 and 10 through 13, respectively.

And, FIG. 16 shows a $^{13}$C-NMR spectrum of this copolymer (100 MHz, solvent: 1,2,4-trichlorobenzene/heavy benzene=8/2, 130.6 ppm of heavy benzene as the reference, 130° C.).

The composition ratio of this copolymer was determined from this to find that p-phenyl styrene, parts/m-phenyl styrene, parts=about 99/1.

The results of these measurements are shown in Table 2.

EXAMPLE 9

A p-phenyl styrene/m-phenyl styrene copolymer was obtained by conducting in the same manner as in Example 8 (2) excepting, as the mixed solution of p-phenyl styrene/m-phenyl styrene, the use of that of p-phenyl styrene/m-phenyl styrene=92/8 in place of p-phenyl styrene/m-phenyl styrene=95/5.

The yield of this copolymer was 0.83 g. And, the differential scanning calorimetric measurement (DSC) was undertaken in the same manner as in Example 8 (2) to find that the glass transition point (Tg) of this copolymer was 150° C. and the melting point (Tm) was 318° C. while the decomposition temperature (Td) determined by the thermogravimetric measurement was 419° C.

The molecular weight of this copolymer was determined by the GPC to find that the weight-average molecular weight (Mw) was 680,000 calculated as polystyrene (PS) and the number-average molecular weight (Mn) was 110,000 calculated as PS.

The composition ratio of this copolymer was determined in the same manner as in Example 8 to find that p-phenyl styrene, parts/m-phenyl styrene, parts=about 98/2. The results of these measurements are shown in Table 2.

EXAMPLE 10

Preparation of a p-phenyl styrene/m-phenyl styrene/styrene ternary copolymer having a co-syndiotactic configuration A p-phenyl styrene/m-phenyl styrene/styrene ternary copolymer was obtained by conducting in the same manner as in Example 8 (2) excepting the use, in Example 8 (2), of a mixed solution of p-phenyl styrene/m-phenyl styrene styrene=93/3/4 (1 mole/liter-toluene solution) in place of the p-phenyl styrene/m-phenyl styrene mixed solution.

The yield of this copolymer was 0.82 g.

And, the differential scanning calorimetric measurement (DSC) was undertaken in the same manner as in Example 8 (2) to find that the glass transition point (Tg) of this copolymer was 149° C. and the melting point (Tm) was 326° C. while the decomposition temperature (Td) determined by the thermogravimetric measurement was 409° C.

Figure 17:
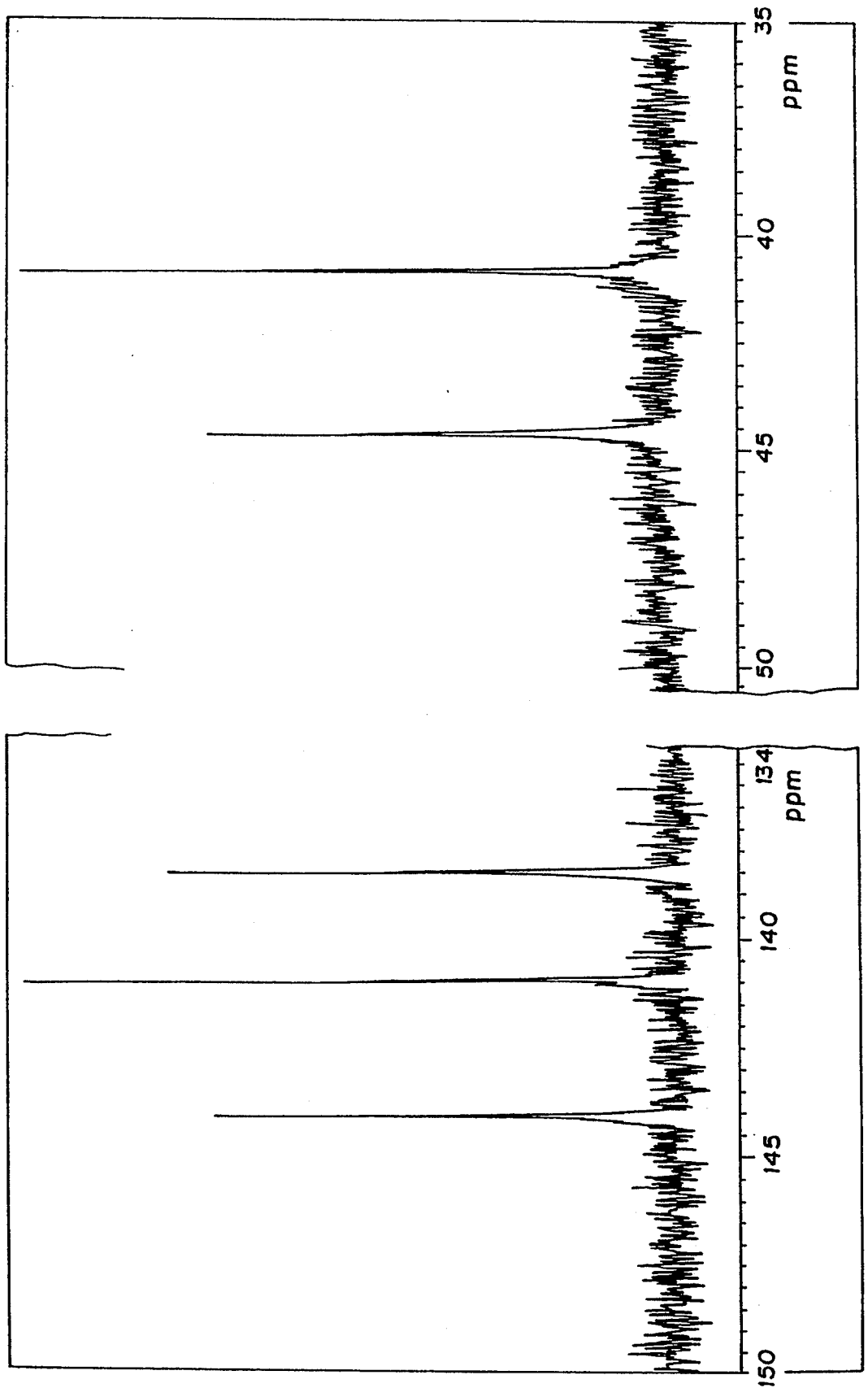

The molecular weight of this copolymer was determined by the GPC to find that the weight-average molecular weight (Mw) was 1,030,000 calculated as polystyrene (PS) and the number-average molecular weight (Mn) was 250,000 calculated as PS. And, a $^{13}$C-NMR spectrum of this copolymer is shown in FIG. 17.

The composition ratio of this copolymer was determined therefrom in the same manner as in Example 8(2) to find that p-phenyl styrene, parts/m-phenyl styrene, parts/styrene, parts=about 98/1/1. The results of these measurements are shown in Table 2.

EXAMPLE 11

Preparation of a copolymer of m-phenyl styrene/styrene having a co-syndiotactic configuration Into a dried reaction vessel under an atmosphere of argon at room temperature were introduced 2 ml of toluene and $8 \times 10^{-4}$ mole (2.6 moles/liter-toluene solution [per aluminum atom]) of the methyl aluminoxane obtained in Example 1(1) as the catalytic ingredient (B) and this reaction solution was admixed at 70° C. with $4 \times 10^{-6}$ mole (0.01 mole/liter-toluene solution) of 1,2,3,4,5-pentamethyl cyclopentadienyl titanium trimethoxide (Cp*Ti(OMe)$_3$) as the catalytic ingredient (A) and a m-phenyl styrene (obtained in Example 8(1))/styrene mixed solution prepared in a 1 mole/liter-toluene solution [m-phenyl styrene/styrene=2/8 (proportion of monomer charge), total of the monomers $8.75 \times 10^{-3}$ mole] to effect the reaction for 4 hours.

Thereafter, the reaction product was put into a mixed solution of methyl alcohol and hydrochloric acid to effect termination of the reaction and deashing and filtered followed by three times of washing with methyl alcohol. This was dried under reduced pressure to give 0.56 g of a m-phenyl styrene/styrene copolymer.

The molecular weight of this copolymer was determined by the GPC to find that the weight-average molecular weight (Mw) was 320,000 calculated as polystyrene (PS) and the number-average molecular weight (Mn) was 49,000 calculated as PS.

Further, this copolymer was subjected to the differential scanning calorimetric measurement (DSC) to find that the glass transition point (Tg) of this copolymer was 96° C. and the melting point (Tm) was 206° C. while the decomposition temperature (Td) determined by the thermogravimetric measurement was 414° C.

Figure 18:
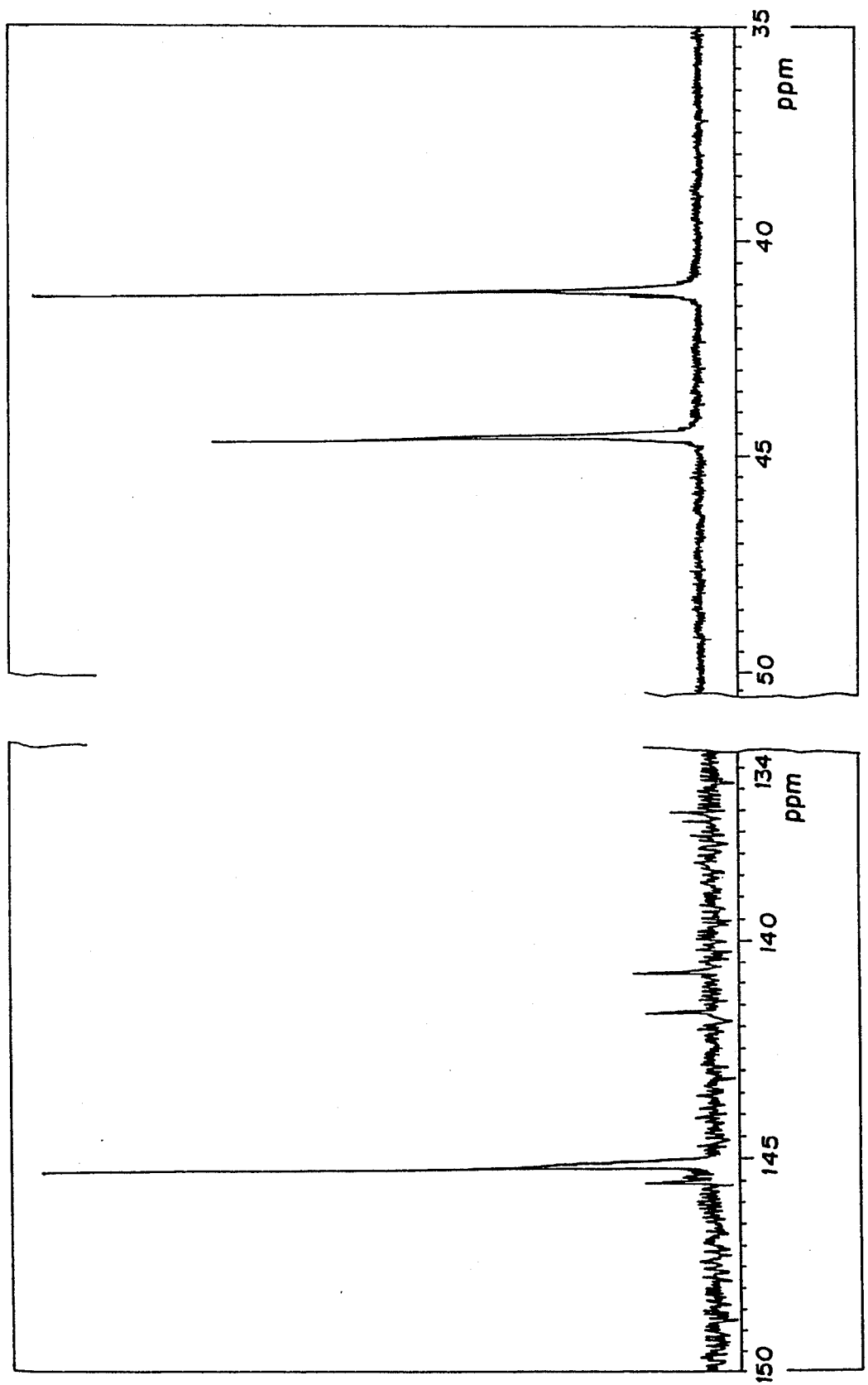

And, a $^{13}$C-NMR spectrum of this copolymer is shown in FIG. 18.

The composition ratio of this copolymer was determined therefrom to find that m-phenyl styrene, parts/styrene, parts=about 5/95. The results of these measurements are shown in Table 2.

EXAMPLE 12

A m-phenyl styrene/styrene copolymer was obtained by conducting in the same manner as in Example 11 except that, in Example 11, the m-phenyl styrene/styrene mixed solution was that of m-phenyl styrene/styrene=1/9 instead of m-phenyl styrene/styrene=2/8.

The yield of this copolymer was 0.84 g.

And, a differential scanning calorimetric measurement (DSC) was undertaken in the same manner as in Example 11 to find that the glass transition point (Tg) of this copolymer was 99° C. and the melting point (Tm) was 226° C. while the decomposition temperature (Td) determined by the thermogravimetric measurement was 415° C.

The molecular weight of this copolymer was determined by the GPC to find that the weight-average molecular weight (Mw) was 410,000 calculated as polystyrene (PS) and the number-average molecular weight (Mn) was 70,000 calculated as PS.

Figure 19:
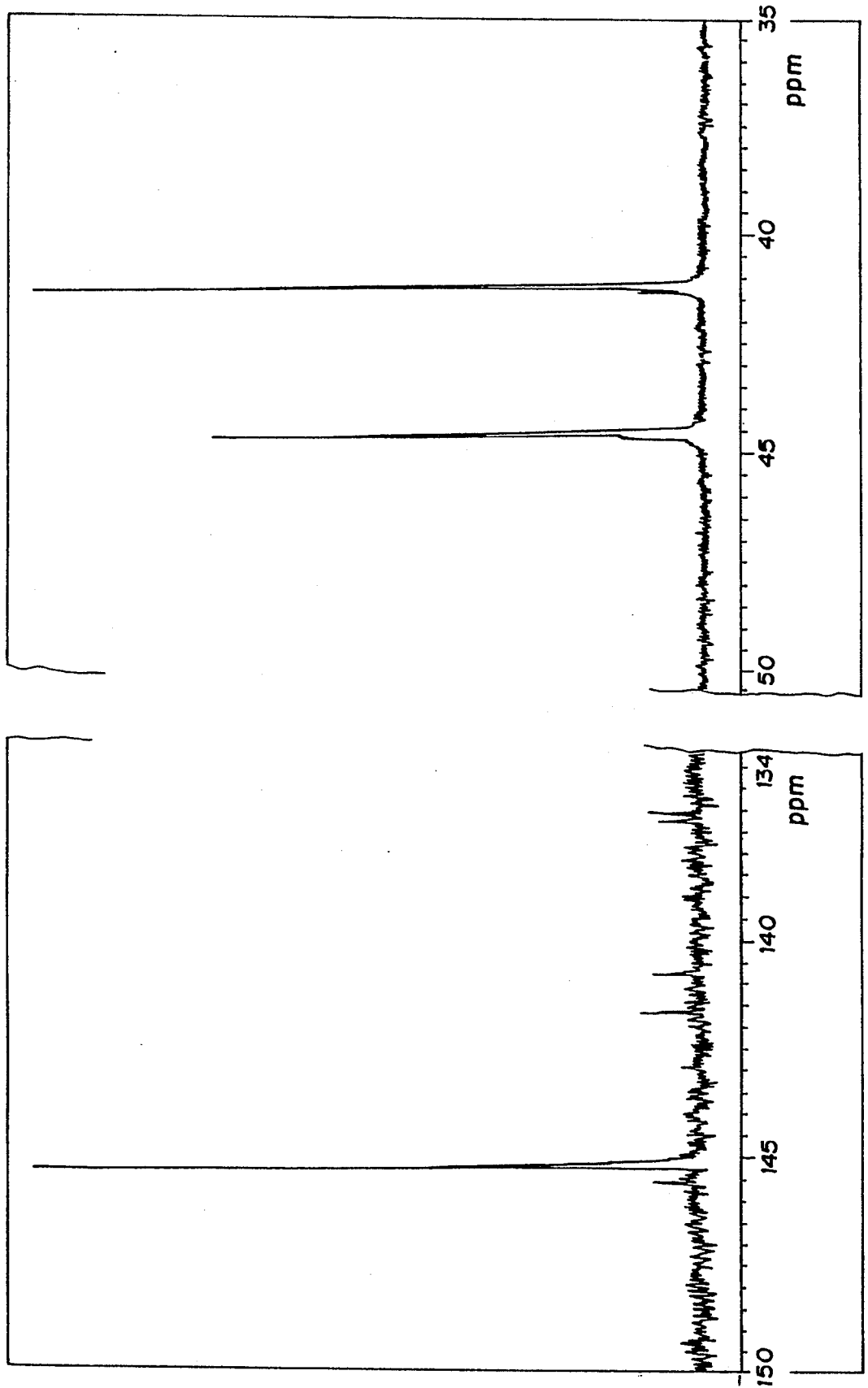

And, a $^{13}$C-NMR spectrum of this copolymer is shown in FIG. 19.

The composition ratio of this copolymer was determined in the same manner as in Example 11 to find that m-phenyl styrene, parts/styrene, parts=about 3/97. The results of these measurements are shown in Table 2.

EXAMPLE 13

(1) Preparation of 4-vinyl-4-methyl biphenyl

Under a stream of an inert gas with agitation, a drop of 1,2-dibromoethane was added to a diethyl ether (100 ml) solution of 1.70 g (0.07 mole) of granular metallic magnesium and the Grignard reagent reaction was started by heating. The liquid temperature was increased up to refluxing and then a diethyl ether (70 ml) solution of 8.61 ml (0.07 mole) of p-bromotoluene was gradually added dropwise taking 30 minutes. After completion of the dropwise addition, it was kept standing under reflux for 1 hour. The reaction solution was cooled to room temperature and it was added dropwise, at room temperature, to a diethyl ether (100 ml) solution of 6.54 ml (0.05 mole) of p-bromo-styrene and 0.32 g (0.6 mmole) of a nickel chloride-(1,3-diphenyl phosphino propane) complex. After completion of the dropwise addition, refluxing was continued for 4 hours. The reaction solution was poured into 500 ml of ice water and the pH was adjusted to be weakly acidic. Extraction was made with hexane and, through purification by washing, drying, removal of the solvent by distillation and silica gel column chromatography, 7.28 g (yield 75%) of 4-vinyl-4'-methyl biphenyl were obtained.

The result of the H-NMR (solvent: heavy chloroform, 90 MHz) was as follows:

$\delta$2.33 (3H, s, —CH$_3$);

$\delta$5.21 (2H, dd, HC=C-[trans]);

$\delta$5.72 (2H, dd, HC=C-[cis]);

$\delta$6.71 (1H, dd, C=CH-[$\alpha$-position]); and $\delta$7.00 to 7.80 (8H, benzene ring).

(2) Preparation of a 4-vinyl-4'-methyl biphenyl/styrene copolymer having a co-syndiotactic configuration.

A 4-vinyl-4'-methyl biphenyl/styrene copolymer was obtained by conducting in the same manner as in Example 8 (2) excepting the use of a 4-vinyl-4'-methyl biphenyl (obtained in (1) described above)/styrene=1/19 mixed solution in place of the p-phenyl styrene/m-phenyl styrene mixed solution in Example 8 (2).

The yield of this copolymer was 0.58 g.

The molecular weight of this copolymer was determined by the GPC to find that the weight-average molecular weight (Mw) was 360,000 calculated as polystyrene (PS) and the number-average molecular weight (Mn) was 110,000 calculated as PS.

Further, a differential scanning calorimetric measurement (DSC) was undertaken in the same manner as in Example 8 (2) for this copolymer to find that the glass transition point (Tg) of this copolymer was 105° C. and the melting point (Tm) was 221° C. while the decomposition temperature (Td) determined by the thermogravimetric measurement was 410° C.

Figure 20:
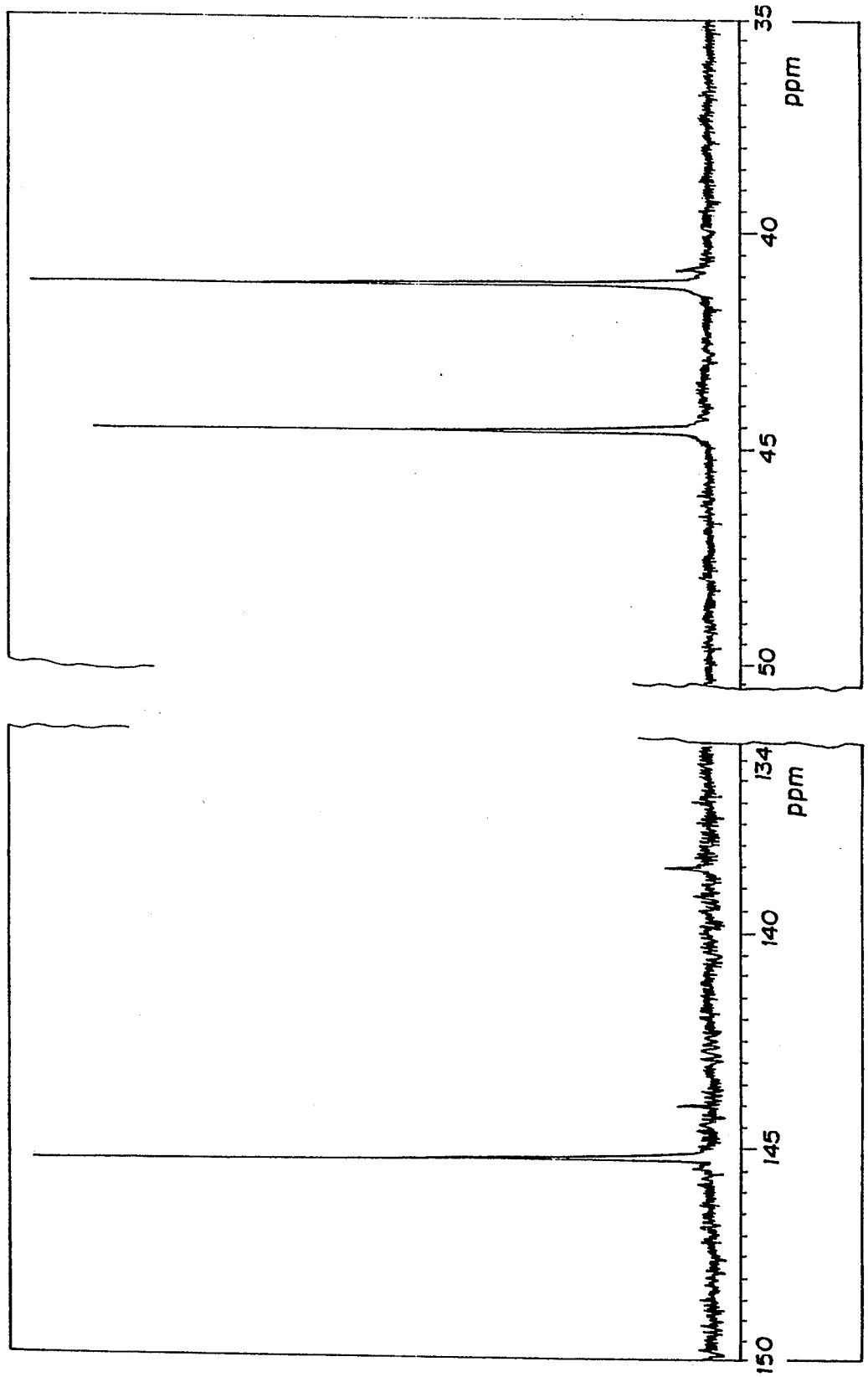

And, a $^{13}$C-NMR spectrum of this copolymer is shown in FIG. 20.

The composition ratio of this copolymer was determined therefrom in the same manner as in Example 8 (2) to find that the 4-vinyl-4'-methyl biphenyl, parts/styrene, parts=about 1/19. The results of these measurements are shown in Table 2.

integer of 0 to 5, when m is a plural number, each $R^6$ is the same or different from each other, (b) structural units (IV) of the formula

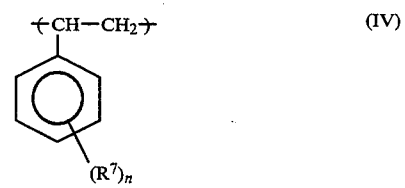

(IV)

wherein $R^7$ is a substituted aryl group having a substituent selected from the group consisting of a hydrogen atom, a halogen atom and an alkyl group, and n is an integer of 1 to 5, provided that structural units (III) and (IV) are not the same, the copolymer containing at least 0.1 mol %, but at most 20 mol % of the structural units (IV), the copolymer having a stereospecificity mainly of a syndiotactic structure, whereby the styrene-based copolymer has at least 30% of syndiotacticity in the racemic pentad, and having a degree of polymerization of at least 5.

2. The copolymer of claim 1, wherein the structural units (IV) comprise two different structural units.

TABLE 2

|  | Monomers charged | Proportion of charged monomers | Composition ratio of product | From DSC Tg (°C.) | From DSC Tm (°C.) | From TG Td (°C.) | *1 Td-Tm (°C.) | From GPC Mw*2 (× 10$^4$) | From GPC Mn*2 (× 10$^4$) | Mw/Mn |
|---|---|---|---|---|---|---|---|---|---|---|
| Example 8 | p-phenyl styrene/ m-phenyl styrene | 95/5 | 99/1 | 160 | 335 | 416 | 81 | 100 | 23 | 4.4 |
| Example 9 | p-phenyl styrene/ m-phenyl styrene | 92/8 | 98/2 | 150 | 318 | 419 | 101 | 68 | 11 | 6.1 |
| Example 10 | p-phenyl styrene/ m-phenyl styrene/ styrene | 93/3/4 | 98/1/1 | 149 | 326 | 409 | 83 | 103 | 25 | 4.1 |
| Example 11 | m-phenyl styrene/ styrene | 2/8 | 5/95 | 96 | 206 | 414 | 208 | 32 | 4.9 | 6.7 |
| Example 12 | m-phenyl styrene/ styrene | 1/9 | 3/97 | 99 | 226 | 415 | 189 | 41 | 7.0 | 5.9 |
| Example 13 | 4-vinyl-4'-methyl biphenyl/styrene | 1/19 | 3/97 | 105 | 221 | 410 | 189 | 36 | 11 | 3.3 |

*1: Range of temperature suitable for melt molding
*2: Calculated as polystyrene Possibility of Industrial Utilization The aryl styrene-based polymer of the present invention can be effectively utilized as a heat-resistant polymer or a precursor of functional materials and the like.

And, the styrene-based polymer of the present invention can be effectively utilized as a heat-resistant resin, base material of films and the like.

We claim:

1. A styrene-based copolymer comprising
(a) structural units (III) of the formula

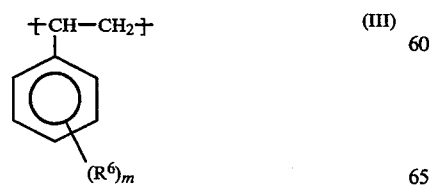

(III)

wherein $R^6$ is a hydrogen atom, a halogen atom or an alkyl group having 1 to 20 carbon atoms and m is an 3. The copolymer of claim 1, wherein the structural unit (III) is selected from the group consisting of styrene, p-methyl styrene, m-methyl styrene, o-methyl styrene, 2,4-dimethyl styrene, 2,5-dimethyl styrene, 3,4-dimethyl styrene, 3,5-dimethyl styrene, p-tert-butyl styrene, p-chloro styrene, m-chloro styrene, o-chloro styrene, p-bromo styrene, m-bromo styrene, o-bromo styrene, p-fluoro styrene, m-fluoro styrene, o-fluoro styrene and o-methyl-p-fluoro styrene.

4. The copolymer of claim 3, wherein $R^7$ is an aryl group selected from the group consisting of benzene, naphthalene, phenanthrene, anthracene, pyrene, chrysene, biphenyl, terphenyl, fluorene, pentalene, indene, azulene, heptalene, biphenylene, indacene, acenaphthylene, phenalene, fluoranthene, acephenanthrene, aceanthrylene, triphenylene, naphthacene, preiadene, picene, perylene, pentaphene, pentacene, rubicene, corocene, pyranthrene and ovalene.

5. The styrene-based copolymer of claim 1, wherein the degree of polymerization is at least 10.

6. The styrene-based polymer of claim 5, wherein the styrene-based copolymer has at least 50% of syndiotacticity in the racemic pentad.

* * * * *

UNITED STATES PATENT AND TRADEMARK OFFICE
CERTIFICATE OF CORRECTION

PATENT NO. : 5,403,908
DATED : April 4, 1995
INVENTOR(S) : WATANABE et al

It is certified that error appears in the above-indentified patent and that said Letters Patent is hereby corrected as shown below:

Title page, item [63], after "abandoned", insert --which is the national phase application of PCT/JP90/01214, filed September 21, 1990--.

Title page, item "[30] Foreign Application Priority Data", insert --Sept. 21, 1989 [JP] Japan ...... 1-246187--.

Signed and Sealed this

Thirty-first Day of December, 1996

Attest:

BRUCE LEHMAN

*Attesting Officer*  *Commissioner of Patents and Trademarks*